United States Patent [19]
Fehr et al.

[11] Patent Number: 5,287,781
[45] Date of Patent: Feb. 22, 1994

[54] DOUGH FEEDER/CUTTER

[76] Inventors: Amos Fehr; Joseph Chong, both of 4572 Erie Avenue, Niagara Falls, Ontario, L2E 3N3, Canada

[21] Appl. No.: 727,066

[22] Filed: Jul. 8, 1991
(Under 37 CFR 1.47)

Related U.S. Application Data

[63] Continuation of Ser. No. 637,862, Jan. 8, 1991, abandoned.

[30] Foreign Application Priority Data

Jan. 8, 1990 [CA] Canada ............................. 2007327

[51] Int. Cl.⁵ .................................. A21C 11/10
[52] U.S. Cl. ........................... 83/155; 83/157; 83/215; 83/266; 83/350; 83/932
[58] Field of Search ................. 83/932, 936, 350, 353, 83/266, 218, 227, 228, 157, 29, 734, 155, 215; 425/363, 364 R, 374, 308; 270/30, 39, 21.1

[56] References Cited

U.S. PATENT DOCUMENTS

| | | | |
|---|---|---|---|
| 4,500,276 | 2/1985 | Cherkasky et al. | 425/308 X |
| 4,731,008 | 3/1988 | Hayashi et al. | 425/363 X |
| 4,741,233 | 5/1988 | Mershon | 270/30 X |
| 4,971,545 | 11/1990 | Willett | 425/363 X |
| 5,007,623 | 4/1991 | Unkuri et al. | 270/39 |

*Primary Examiner*—Douglas D. Watts
*Assistant Examiner*—Rinaldi Rada
*Attorney, Agent, or Firm*—Sim & McBurney

[57] ABSTRACT

A novel dough feeding, cutting and depositing apparatus is provided herein. It includes a pivotally-mounted feed tray. Means are provided on the feed tray for gripping a continuous dough sheet and for advancing it forwardly along the feed tray to the downstream end of the feed tray. Means are provided for cutting a discrete sheet of dough from a continuous dough sheet overlapping the end of the feed tray, and for depositing such discrete sheet of dough on a sheet of dough tray station. Means are provided for moving the upstream end of the feed tray upwardly to its maximum "up" position for the duration of the time the continuous dough sheet is being advanced forwardly along the feed tray. Means are provided for moving the upstream end of the feed tray downwardly to its maximum "down" position for the duration of the time the means for cutting is effecting the cutting of the continuous dough sheet into a discrete sheet of dough.

12 Claims, 23 Drawing Sheets

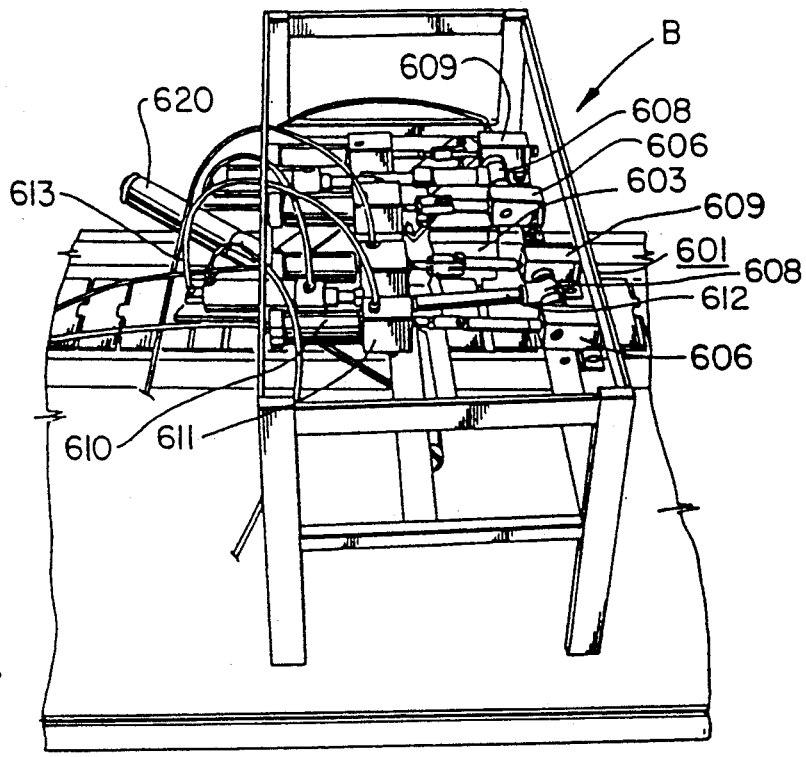
FIG.4
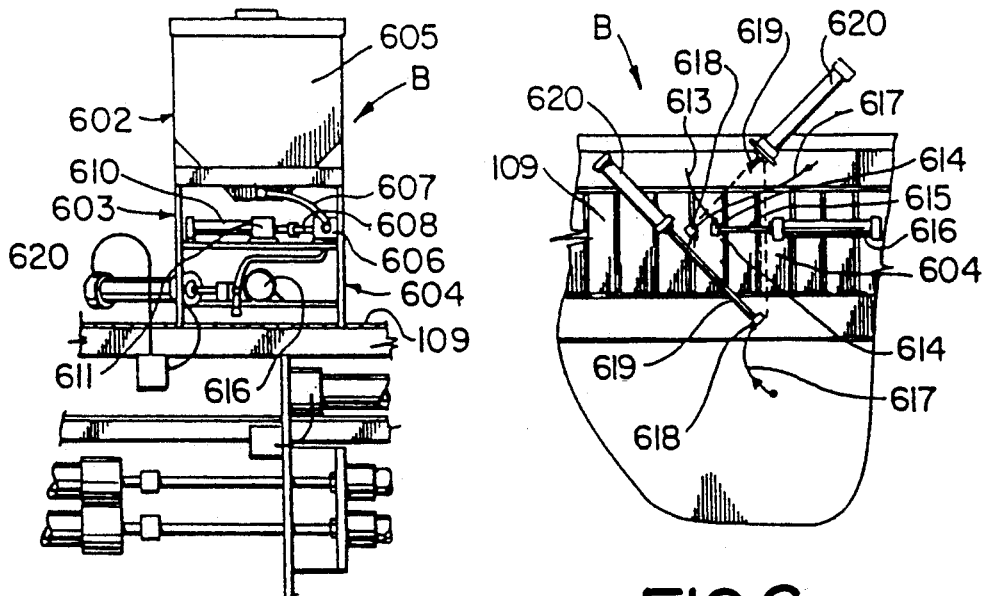
FIG.5
FIG.6

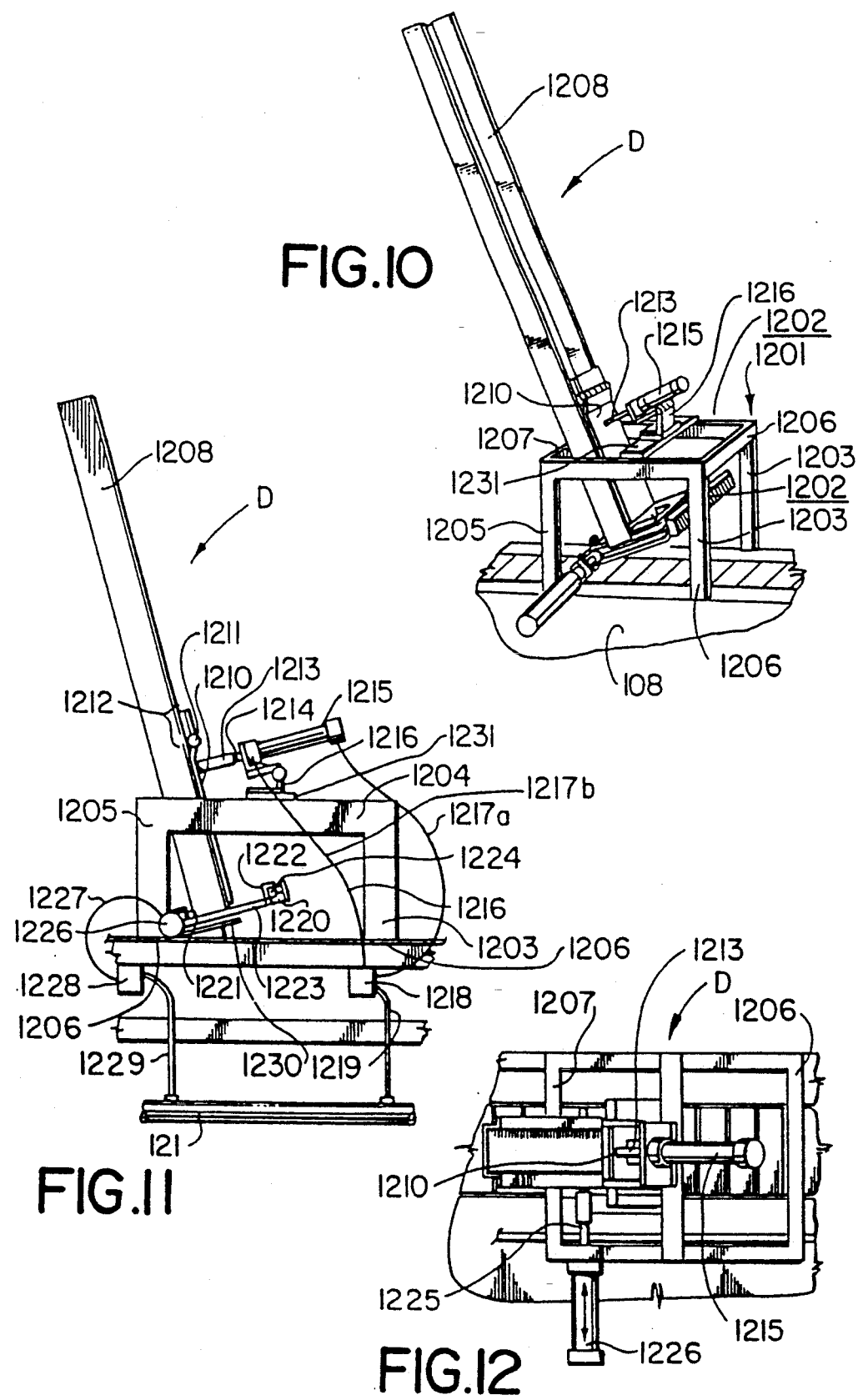

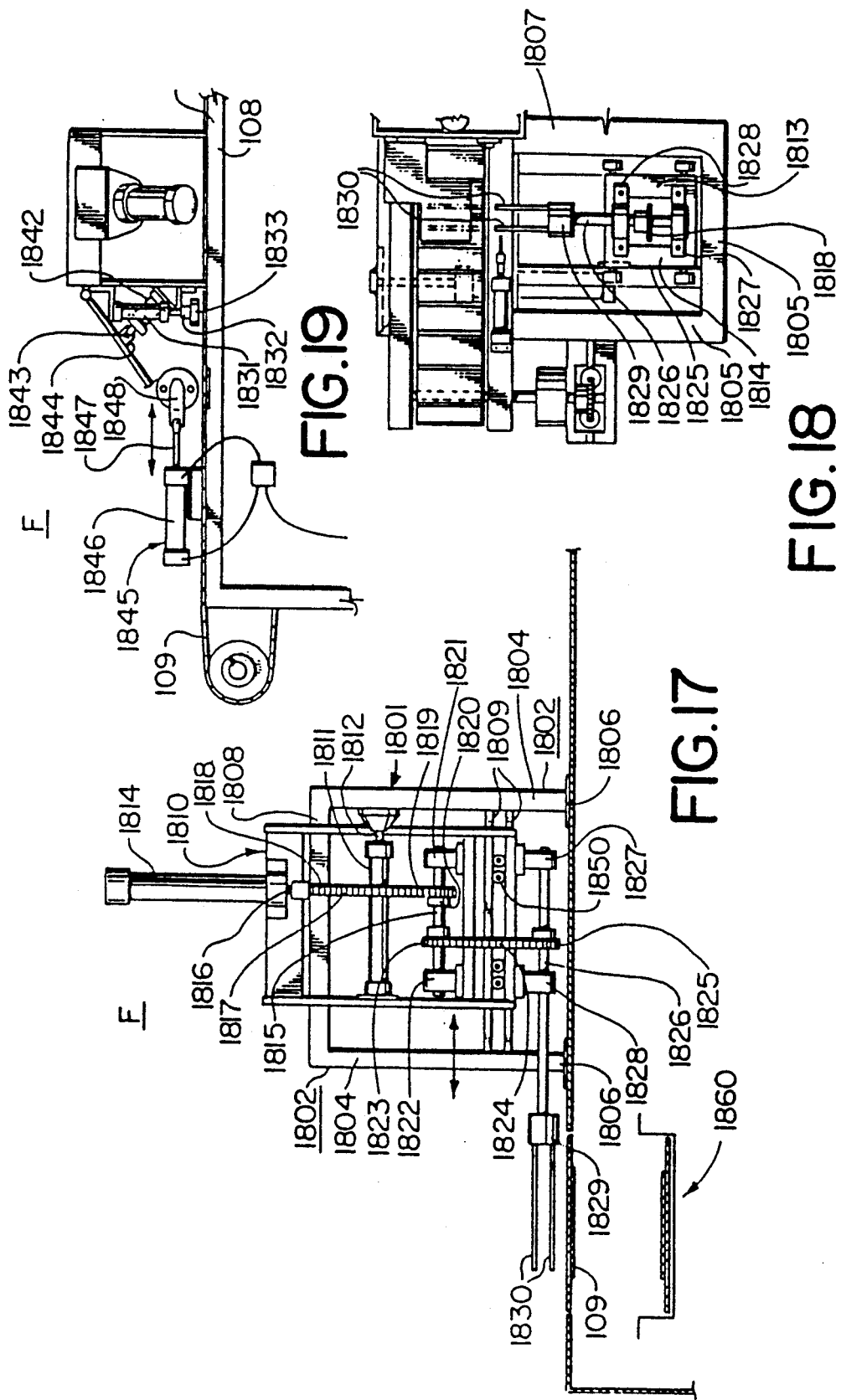

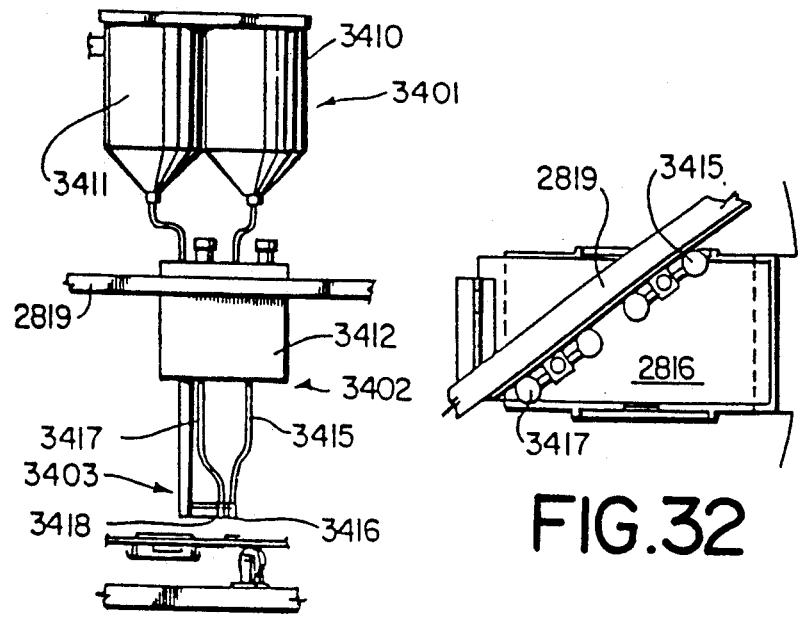
FIG.31
FIG.32
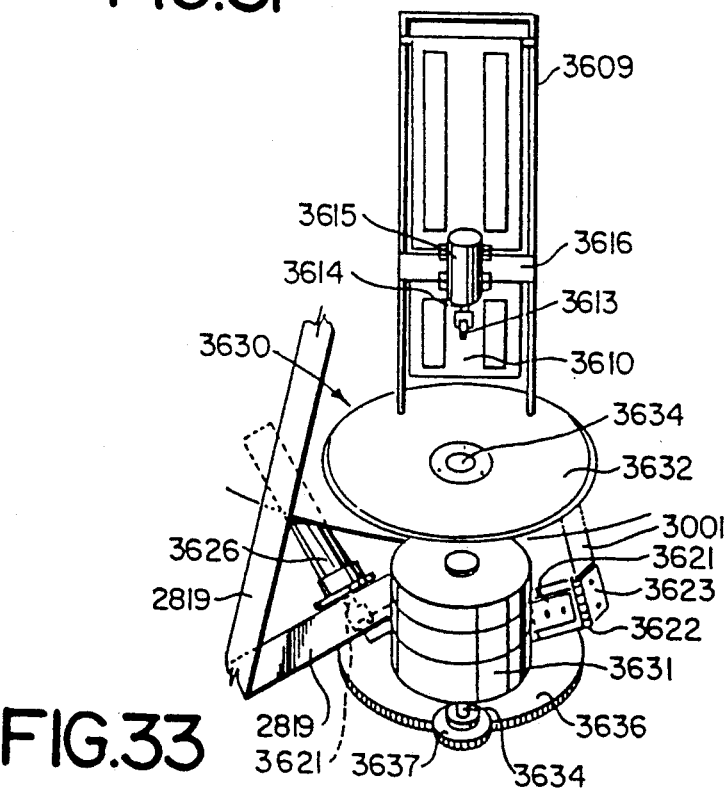
FIG.33

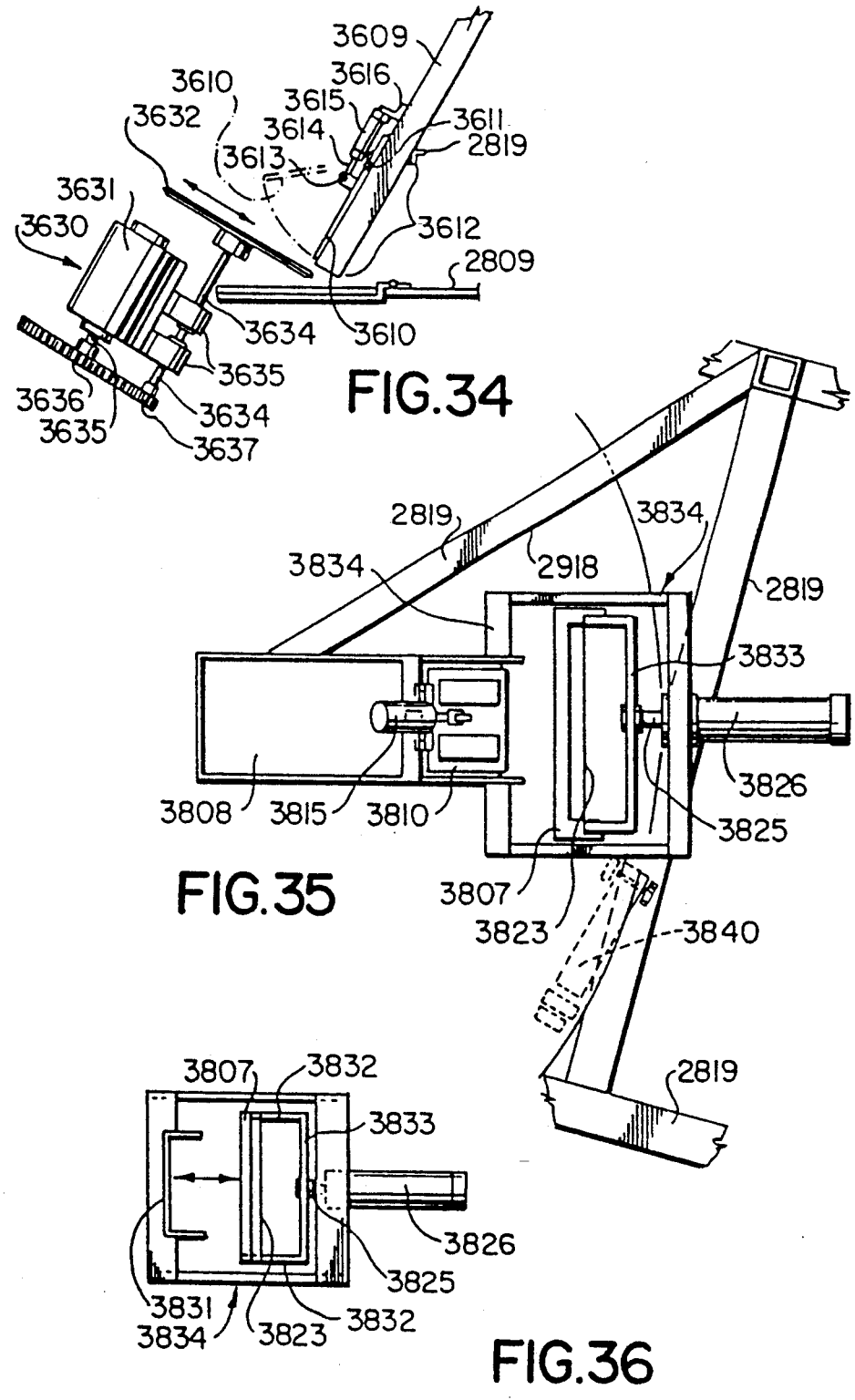

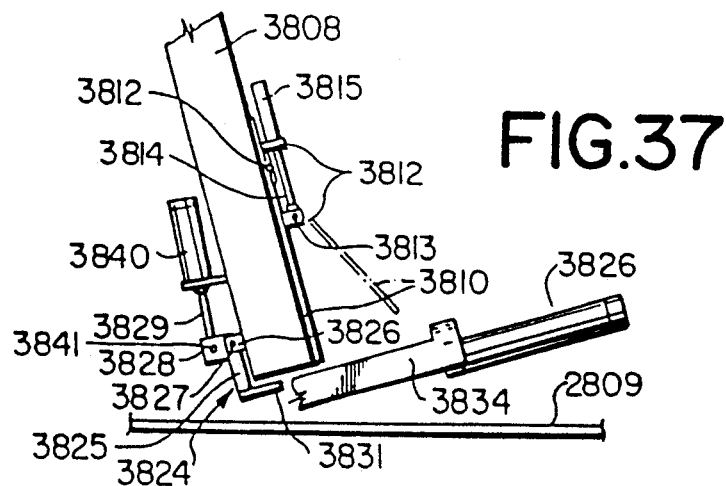
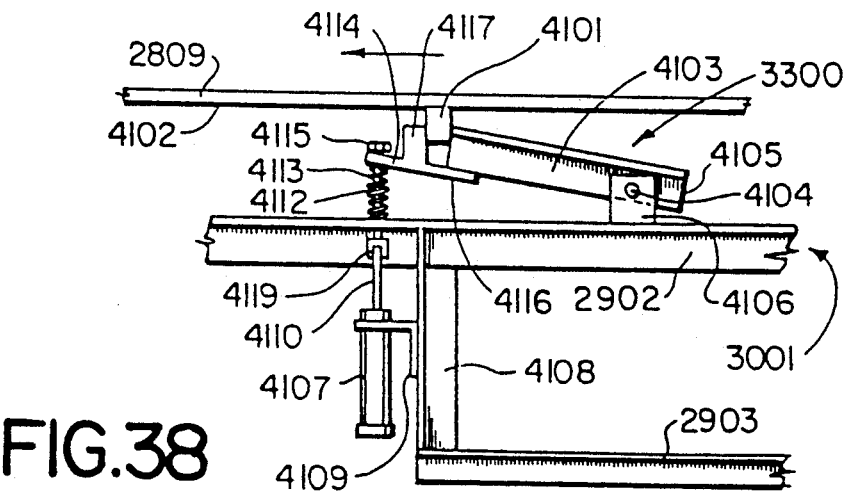
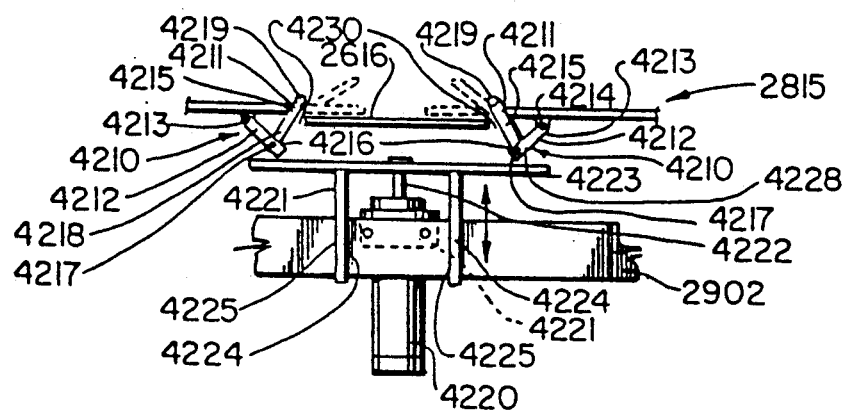

DOUGH FEEDER/CUTTER

This application is a continuation application of Ser. No. 07/637,862, filed Jan. 8, 1991 now abandoned.

This invention relates to a novel dough feeding and slicing apparatus especially adapted for use in a machine for making filled dough products.

Many patents are now directed to apparatus for the manufacture of various filled food products mechanically rather than by hand. Among them are the following:

Canadian Patent 586,999, patented Nov. 17, 1959, by Paul Wolf, provided a method and apparatus for the manufacture of filled wafer sandwiches of oblong shape including means for providing baked pastry strips end-to-end with joints therebetween.

Canadian Patent No. 1,006,050 patented, Mar. 1, 1977, by H.W.H. Hai, which related to apparatus and method for the making of filled pastry rolls, especially spring rolls, including a cutter to cut a square of pastry from the leading end of a continuously-fed strip of pastry from a roll thereof.

Canadian Patent 1,024,825 patented, Jan. 24, 1970, by E. Trostman et al, and its corresponding U.S. Pat. No. 4,073,953 patented Feb. 14, 1978, which provided a method and apparatus for the production of rolled food products, e.g. chinese spring rolls, including means for rolling a filler within a flat wrap which had previously been deposited on a support.

U.S. Pat. No. 2,001,792, patented May 21, 1935 by L. Lombi, provided a ravioli machine having sheeting rolls for forming the dough into sheets, with no separation of a continuous dough sheet into individual sheets of dough until after the continuous dough sheet contained a measured amount of cheese thereon.

U.S. Pat. No. 3,611,950 patented, Oct. 12, 1971, by M. Battaglia, provided a manicotti-making machine in which dough was continuously fed between rolls and extruded in the form of a flat sheet into a hot water bath where it was cooked, the first cutting of the continuous dough sheet taking place after that continuous dough sheet contained a measured amount of cheese thereon.

U.S. Pat. No. 3,669,007, patented Jun. 13, 1972, by L. Pulici, provided a method and apparatus for rolling and tucking filled foodstuffs in which individual outer food wraps were folded around a food filling.

U.S. Pat. No. 3,667,971 patented Jun. 13, 1972 by F. W. Brunner provided a method of forming and wrapping a food product in which slices of cornmeal were cut from a cornmeal block and were deposited on a conveyor, where they were loaded with food fillings.

U.S. Pat. No. 3,698,309, patented Oct. 17, 1972 by G. Steels, taught a dough laminating machine which used a reciprocating dough sheet laminating machine in conjunction with a continuously movable band conveyor for conveying continuous dough sheets.

U.S. Pat. No. 3,704,664, patented Dec. 5, 1972 by A. Fisher, Jr., taught a Swiss roll forming apparatus which included an endless conveyor to carry the flat sheet of dough, a creme coater and then a cutting and separating device.

U.S. Pat. No. 3,735,692, patented May 29, 1973 by A. Marchignoni, taught a pizza making machine which used a vertically-reciprocal pusher to press the pizza dough mixture against a movable wall to premold the pizza dough into a preform.

U.S. Pat. No. 3,780,643, patented December, 1973, by Papai, which provided an apparatus designed for the automatic assembling of pizza pies.

U.S. Pat. No. 3,804,637, patented Apr. 16, 1974 by J. Regsa taught a dough lapping apparatus which included a feed conveyor conveying an endless sheet of dough, and a pair of parallel guide rolls at the discharge end of the conveyor.

U.S. Pat. No. 3,912,433, patented Oct. 14, 1975, by K. C. Ma, which provided an automatic egg roll making machine in which egg roll dough sheets which were already cut into individually cut sheets of dough were fed to a conveyor.

U.S. Pat. No. 4,014,245 patented Mar. 29, 1977, by N. Ohkawa, provided a device for wrapping pre-cut sheets of dough around food to make a rolled food.

U.S. Pat. No. 4,023,475, patented May 17, 1977 by M. Mercer, et al, taught a dough converting machine including an input conveyor and a rotary cut-off knife above the sheet of dough on the conveyor.

U.S. Pat. No. 4,060,027, patented Nov. 29, 1977, by D. J. Jenny, provided an apparatus for applying ingredients to a tray which was loaded with dough to provide an edible product.

U.S. Pat. No. 4,073,953, patented Feb. 14, 1978 by E. Trostmann et al, provided a machine for folding a pancake which had been deposited on an air-pervious conveyor.

U.S. Pat. No. 4,084,493, patented Apr. 18, 1978, by E. D. Quinlana, provided an apparatus for producing foodstuff products, namely a food product known as a "burrito", in which an individual sheet of dough had filling ingredients deposited thereon.

U.S. Pat. No. 4,112,834, patented Sep. 12, 1978, by G. A. Thiry, provided a food processing apparatus in which pepperoni slices and cheese slices were deposited on a pizza pie shell.

U.S. Pat. No. 4,313,719, patented May 17, 1972 by B. Lundgres, taught a pancake roller including a plurality of feed belts.

U.S. Pat. No. 4,318,678, patented Mar. 9, 1982 by T. Hayashi, et al, taught a dough sheet cutter including an endless conveyor and a cylindrical cutter in pressing engagement with its upper surface.

U.S. Pat. No. 4,388,059, Patented Jun. 14, 1987 by K. C. Ma, provided an automatic egg roll making apparatus in which a continuous dough sheet was withdrawn from a rolled-up sheet of dough and was then cut into rectangular sheets of dough, which were then filled with food filling and rolled.

U.S. Pat. No. 4,393,758, patented Jul. 19, 1983, provided a food processing apparatus for certain rolled food products, e.g. burritos, enchiladas, egg rolls, cabbage rolls, or blintzes in which the individual outer sheet of dough was conveyed on a conveyor and filling was then applied to such sheet of dough.

U.S. Pat. No. 4,439,124, patented Mar. 27, 1984, by H. Watonabe, provided a machine for automatically making rolled food products, e.g. spring rolls, crepes or the like, by rolling a filling in an edible rectangular skin.

U.S. Pat. No. 4,600,595, patented Jul. 15, 1986 by A. Svengren, et al, provided a machine in which a sheet of pastry material, on a conveyor, was cut into discrete pieces and was then filled.

U.S. Pat. No. 4,640,670, patented Feb. 3, 1987, by A. G. Svengren et al, provided an apparatus for the preparation of a rolled pastry product in which a sheet of pastry material was cut, folded and rolled.

U.S. Pat. No. 4,651,635, patented Mar. 24, 1987, by S. A. Ally, which provided an apparatus for making pastries, e.g. those known as "samosas", including a dough extruder to form dough into sheets, a cooking station and a cutting station to cut the cooked dough sheets into individual sheets of dough.

U.S. Pat. No. 4,691,627, patented Sep. 8, 1987, by G. F. Roberts, provided apparatus for making food products, e.g. burritos, having fillings, or wrapped or enrobed in dough sheets, e.g. tortillas, in which individual sheets of dough were provided simultaneously with a crease and with a filling deposited into the crease.

U.S. Pat. No. 4,716,821, patented Jan. 5, 1988, provided a line for assembling stuffed proteinaceous patties including depositing preformed proteinaceous patties on a conveyor.

These patents have not provided apparatus for efficiently and quickly feeding individual sheets of dough to a sheet of dough filling station. Accordingly, applicant has provided an improvement therein by means of a food production apparatus provided by Canadian Patent No. 1,260,318 patented Sept. 26th, 1989. One such apparatus included: a) a supporting elongated frame structure; b) a continuous conveyor system mounted longitudinally therewithin; c) means for intermittently moving the conveyor longitudinally along the supporting elongated frame structure; d) a sheet of dough loading and unloading mechanism at the front end of the conveyor, the mechanism having means thereon for intermittently loading a square-shaped sheet of dough at a diamond orientation onto a discrete region of the conveyor while the conveyor is stationary; e) at least one foodstuff loading mechanism operable to load foodstuff onto discrete regions of the sheet of dough while the sheet of dough was resting on the conveyor and while the conveyor was stationary; f) a dough-folding mechanism having longitudinally-spaced-apart, mutually-opposed means which were operable to hold the diamond-shaped loaded sheet of dough in place, and transversely spaced-apart mutually-opposed means which were operable to raise the diametrically-opposed transverse corners of the diamond-shaped loaded sheet of dough and to fold them inwardly to meet and overlap slightly at the centre, thereby to provide a hexagonally-shaped, overlapped-folded, loaded sheet of dough, while the conveyor was stationary; g) a rolling mechanism having first means operable to raise a trailing edge of the so-formed hexagonally-shaped, overlapped-folded, loaded sheet of dough, and second means operable to roll that raised loaded sheet of dough and to rotate it at least 2½ turns, thereby to provide a generally, cylindrical, overlapped-folded, loaded product, while the conveyor was stationary; h) means for discharging that product from the conveyor; and i) means to synchronize the forward intermittent movement of the conveyor with the sequential operation of the sheet of dough loading and unloading mechanism, with the foodstuff loading mechanism, with the sheet of dough folding mechanism, with the rolling mechanism and with the discharge means.

Another such apparatus taught in the above-identified Canadian Patent No. 1,260,318 included a) a supporting frame structure; b) a conveyor system supported thereon, the conveyor system comprising a rotary table rotationally mounted on the supporting frame structure, the rotary table being adapted to convey material thereon at a discrete location along the circumference of the rotary table along a circular path past a plurality of work stations; c) intermittent rotating means for intermittently rotationally moving the rotary table and hence at least one discrete location from one work station to the next, downstream, work station; d) a sheet of dough feeding mechanism, the mechanism having means thereon for intermittently loading a square-shaped sheet of dough at a diamond orientation onto at least one first discrete location on the rotary table while the rotary table was stationary; e) at least one foodstuff loading mechanism at least one work station downstream from the sheet of dough feeding mechanism, the foodstuff loading mechanism being operable to load foodstuff onto discrete regions of a sheet of dough while the sheet of dough was resting on the rotary table and while the rotary table was stationary; f) a loaded sheet of dough folding mechanism at a work station downstream from the foodstuff loading work station, the sheet of dough folding mechanism being operable to provide a substantially-hexagonally-shaped, overlapped-folded, loaded sheet of dough, while the rotary table was stationary; g) a loaded, folded sheet of dough rolling mechanism at a work station downstream from the loaded sheet of dough folding work station, operable to provide a generally-cylindrical, overlapped-folded, loaded, rolled product, while the rotary table was stationary; h) discharging means at the sheet of dough rolling mechanism work station for discharging that product from the rotary table while the rotary table was stationary; and i) means to synchronize the intermittent rotary movement of the rotary table with the sequential operation of the sheet of dough feeding mechanism, with the foodstuff loading mechanism, with the loaded sheet of dough folding mechanism, with the folded, loaded, sheet of dough rolling mechanism and with the discharge means.

Various specific embodiment of the broadly-defined following mechanism were also disclosed in the first embodiment disclosed in the above-identified Canadian Patent No. 1,260,318, namely: a) the supporting elongated frame structure; b) the continuous conveyor system mounted longitudinally therewithin; c) the means for intermittently moving the conveyor longitudinally along the supporting elongated frame structure; d) the sheet of dough feeding mechanism; e) the foodstuff loading mechanism operable to load foodstuff onto discrete regions of the sheet of dough while the sheet of dough was resting on the conveyor and while the conveyor was stationary; f) the dough-folding mechanism having longitudinally-spaced-apart, mutually-opposed means which were operable to hold the diamond-shaped loaded sheet of dough in place, and transversely spaced-apart mutually-opposed means which were operable to raise the diametrically-opposed transverse corners of the diamond-shaped loaded sheet of dough and to fold them inwardly to meet and overlap slightly at the centre, thereby to provide a hexagonally-shaped, overlapped-folded, loaded sheet of dough, while the conveyor was stationary; g) the rolling mechanism having first means operable to raise a trailing edge of the so-formed hexagonally-shaped, overlapped-folded, loaded sheet of dough, and second means operable to roll that raised loaded sheet of dough and to rotate it at least 2½ turns, thereby to provide a generally, cylindrical, overlapped-folded, loaded product, while the conveyor was stationary; h) the means for discharging that product from the conveyor; and i) the means to synchronize the forward intermittent movement of the conveyor with the sequential operation of the sheet of dough loading and unloading mechanism, with the food stuff loading mechanism, with the sheet of dough folding mechanism, with the rolling mechanism and with the discharge means.

Various specific embodiment of the broadly defined following mechanism were disclosed in the second embodiment disclosed in the above-identified Canadian Patent No. 1,260,318, namely: a) the supporting frame structure; b) the conveyor system supported thereon, the conveyor system comprising a rotary table rotationally mounted on the supporting frame structure, the rotary table being adapted to convey material thereon at a discrete location along the circumference of the rotary table along a circular path past a plurality of work stations; c) the intermittent rotating means for intermittently rotationally moving the rotary table and hence at least one discrete location from one work station to the next, downstream, work station; d) the sheet of dough feeding mechanism; e) the foodstuff loading mechanism at one work station downstream from the sheet of dough feeding mechanism, the foodstuff loading mechanism being operable to load foodstuff onto discrete regions of a sheet of dough while the sheet of dough is resting on the rotary table and while the rotary table was stationary; f) the loaded sheet of dough folding mechanism at a work station downstream from the foodstuff loading work station, the sheet of dough folding mechanism being operable to provide a substantially-hexagonally-shaped, over-lapped-folded, loaded sheet of dough, while the rotary table was stationary; g) the loaded, folded sheet of dough rolling mechanism at a work station downstream from the loaded sheet of dough folding work station, operable to provide a generally-cylindrical, overlapped-folded, loaded, rolled product, while the rotary table is stationary; h) the discharging means at the sheet of dough rolling mechanism work station for discharging that product from the rotary table; and i) the means to synchronize the intermittent rotary movement of the rotary table with the sequential operation of the sheet of dough feeding mechanism, with the food-stuff loading mechanism, with the loaded sheet of dough folding mechanism, with the folded, loaded, sheet of dough rolling mechanism and with the discharge means.

Various synchronizing means were also thus included in both of the embodiments disclosed in the above-identified Canadian Patent No. 1,260,318 so as to provide the necessary sequence of start-and-stop movement of the vonveyor, coordinated with the actuation of each of the devices at each of the processing stations. Such synchronization means in each of the embodiments of the invention disclosed and claimed in the above-identified Canadian Patent No. 1,260,318 could be in the form of limit switches, or, preferably included various motors controlled by a specially written computer program in a microprocessor.

In spite of these improvements in the loading of sheets of dough onto the table of a food processing machine, there is still the need to provide a more efficient such sheet of dough feeding means.

An object then of one broad aspect of this invention is to provide a mechanical dough feeder to feed sheets of dough to a machine for making filled dough products.

An object of another aspect of this invention is to provide such a dough feeder for feeding a continuous dough sheet, slicing such continuous dough sheet into individual sheets of dough and feeding those individual sheets of dough to the table of a machine for making filled dough products, e.g. as described in the various embodiments of the invention disclosed and claimed in the above-identified Canadian Patent No. 1,260,318.

By one broad aspect of this invention a dough feeding apparatus is provided comprising: a pivotally-mounted feed tray; means on the feed tray for gripping a continuous dough sheet and for advancing it forwardly along the feed tray to the downstream end of the feed tray; means for cutting a discrete sheet of dough from a continuous dough sheet overlapping the feed tray, and for depositing the discrete sheet of dough on a sheet of dough tray station; means for moving the upstream end of the feed tray upwardly to its maximum "up" position, and for maintaining the upstream end at the "up" position for the duration of the time that the continuous sheet of dough is being advanced forwardly along the feed tray; and means for moving the upstream end of the feed tray downwardly to its maximum "down" position, and for maintaining the upstream end at the "down" position for the duration of the time the means for cutting is effecting the cutting of the discrete sheet of dough.

The means for gripping a continuous dough sheet preferably comprises a pair of counter-rotatably driven rollers at the downstream end of the feed tray.

More preferably, such means comprises a pair of counter-rotatably driven rollers at the downstream end of the feed tray, and the drive for the drive rollers comprises a chain drive operated by a single double-acting, double-rod-end pneumatic cylinder. Still more preferably, such means comprises a pair of counter-rotatably driven rollers at the downstream end of the feed tray, and the drive for the counter-rotatably driven rollers comprises a chain drive operated by a single double-acting, double-rod-end pneumatic cylinder, the chain drive including an upstream driven sprocket and a downstream indexing clutch drive.

In such apparatus, the counter-rotatably driven rollers preferably pull up a continuous dough sheet from a handling container.

The means for cutting preferably comprises a guillotine knife blade, and preferably where such knife blade is operated by the power stroke of a pneumatic cylinder.

The means for moving the upstream end of the feed tray upwardly and downwardly includes a pneumatic cylinder, the rod end of which is secured to a link arm. Such means for moving the upstream end of the feed tray upwardly and downwardly preferably includes a pneumatic cylinder, the rod end of which is secured to a link arm, the movement in an upwards direction being also accompanied by a movement in a forward direction. The means for moving the upstream end of the feed tray upwardly and downwardly still more preferably includes a pneumatic cylinder, the rod end of which is secured to a link arm, the movement in the downward direction being also accompanied by a movement in a rearward direction.

The downstream end of the feed tray is adjacent to a feed tray of a conveyor element of a food production apparatus. The conveyor element of a food production apparatus may comprise an intermittently-driven, longitudinally-extending, continuous conveyor provided with a plurality of spaced-apart dough trays thereon. Alternatively, the conveyor element of a food production apparatus may comprise an intermittently-rotated, rotary table provided with a plurality of circumferentially-spaced-apart dough trays thereon.

In a preferred embodiment, at least one, and preferably two, such dough feeding, cutting and depositing apparatus is provided in combination with an intermittently driven conveyor provided with a plurality of spaced-apart dough trays thereon.

In other words, the apparatus of an embodiment of this invention includes a pivotally-mounted feed tray having a double roll for feeding the dough sheet, with a knife blade for cutting the dough and laying it down across a dough station. In the feeding, or "up" position, the dough sheet is pulled up and fed to the lower end of the feed tray adjacent the table station. In the "cutting" or "out" position, the feed tray is pivoted so that the feeder does not feed dough sheet, but instead the knife blade cuts the dough into a sheet and lays it in the dough sheet station.

In the accompanying drawings

FIG. 3B showing the dough sheet feeder/cutter in its "up" or feeding orientation, and FIG. 3A showing the dough feeder/cutter in its "out" or cutting orientation;

FIG. 4 is a perspective view (with the fluid foodstuff tanks omitted for clarity) of the first foodstuff loading station of the food production apparatus of the first embodiment of the invention of the above-identified Canadian Patent No. 1,260,318 and as shown in FIGS. 1 and 2;

FIG. 5 is a side elevational view of the first foodstuff loading station shown in FIG. 4;

FIG. 6 is a top plan view of the lowermost level of the first foodstuff loading station shown in FIG. 4;

FIG. 10 is a perspective view of a cheese slicing and loading station of the food production apparatus of the first embodiment of the invention of the above-identified Canadian Patent No. 1,260,318 and shown in FIGS. 1 and 2;

FIG. 11 is a side elevational view of the cheese slicing and loading station shown in FIG. 10;

FIG. 12 is a top plan view of the cheese slicing and loading station shown in FIG. 10;

FIG. 17 is a transverse section through the table and the conveyor of the rolling station shown in FIG. 16;

FIG. 18 is a top plan view of the rolling station shown in FIG. 16 and FIG. 17;

FIG. 19 is a longitudinal elevational view of a product unloading station of the first embodiment of the invention of the above-identified Canadian Patent No. 1,260,318 and shown in FIGS. 1 and 2;

FIG. 31 is a side elevational view of one embodiment of the egg and tomato paste station of this second embodiment of the invention of the above-identified Canadian Patent No. 1,260,318 and shown in FIGS. 26 and 27;

FIG. 32 is a top plan view of the egg and tomato paste station shown in FIG. 31;

FIG. 33 is a view of the slicing mechanism of one embodiment of the pepperoni slicing and loading station of this second embodiment of the invention of the above-identified Canadian Patent No. 1,260,318 and shown in FIGS. 26 and 27;

FIG. 34 is a side elevational view of the slicing mechanism of the pepperoni slicing and loading station shown in FIG. 33;

FIG. 35 is a top plan view of the slicing mechanism of one embodiment of the cheese slicing and loading station of this second embodiment of the invention of the above-identified Canadian Patent No. 1,260,318 and shown in FIGS. 26 and 27;

FIG. 36 is a top plan view of a portion of the cheese slicing and loading station shown in FIG. 35;

FIG. 37 is a side elevational view of the portion of the cheese slicing and loading station shown in FIG. 35;

FIG. 38 is a side elevational view of a lock and indexing device of this second embodiment of the invention of the above-identified Canadian Patent No. 1,260,318 and shown in FIGS. 26 and 27;

FIG. 39 is a transverse section through a portion of the rotary table showing one embodiment of the dough folding mechanism of this second embodiment of the invention of the above-identified Canadian Patent No. 1,260,318 and shown in FIGS. 26 and 27;

Figure 46:
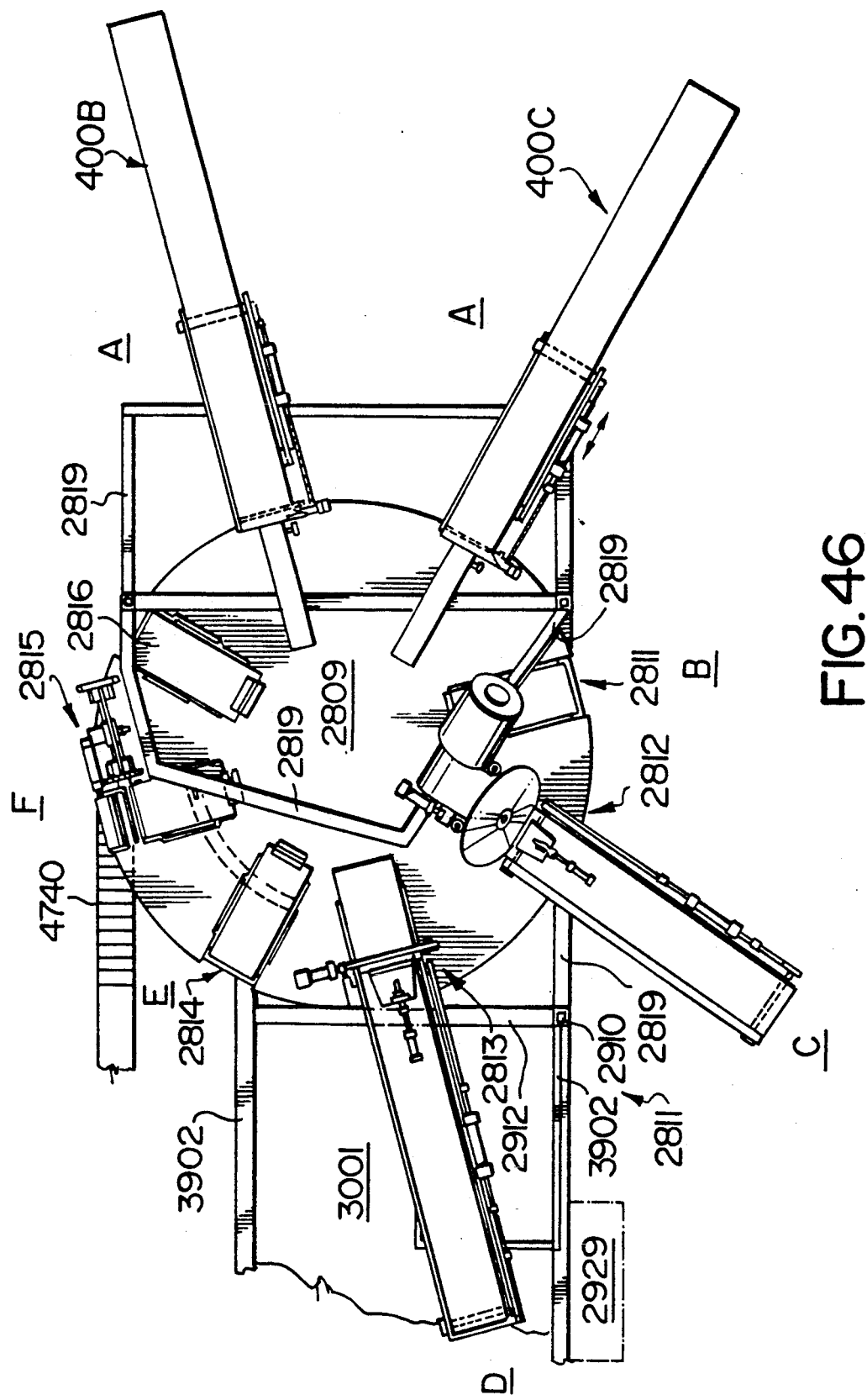
Figure 47:
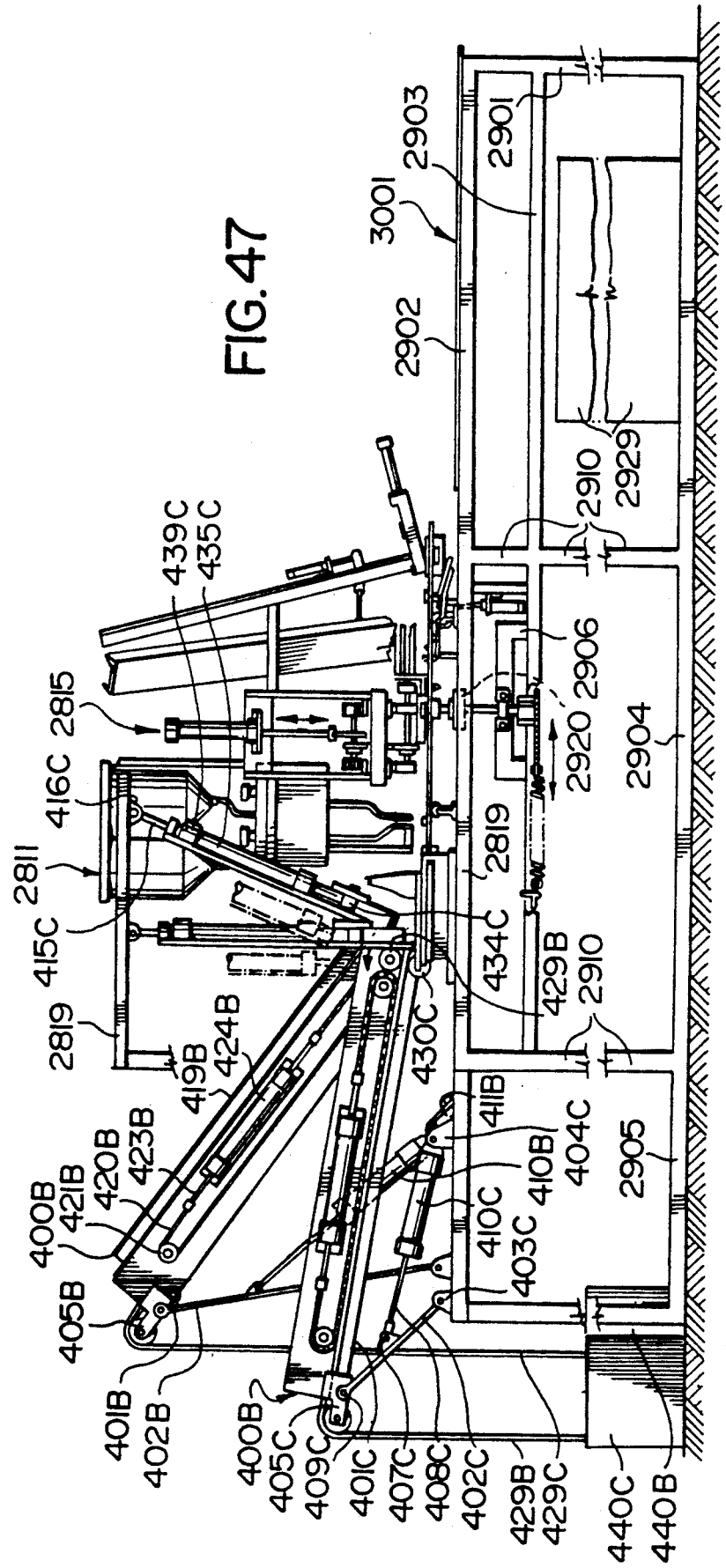

FIG. 46 is a top plan view of the food production apparatus modified by including two dough sheet feeding and sheet of dough cutting and loading mechanisms of one embodiment of this invention in a second embodiment of the invention of the above-identified Canadian Patent No. 1,260,318; and FIG. 47 is a side elevational view of the food-production apparatus of the third embodiment of the invention shown in FIG. 46.

The apparatus with which the dough sheet feeding and loading mechanism of embodiments of the present invention is used, is preferably an apparatus for producing a foodstuff product known hereinafter as a "finger roll" formed in a manner to be particularly described hereinafter from a thin sheet of flour dough that is used to wrap and encapsulate various selected food ingredients therewithin. This produces a form of heretofore conventional edible food products, e.g., egg rolls, spring rolls, manicotti, burritos, enchiladas, blintzes and canneloni. The sheet of dough is generally formed as a square-shaped sheet but is oriented as a diamond-shaped sheet of dough, which then has the food ingredients deposited centrally and transversely thereon in an elongated manner so as to allow the opposite corners of the sheet first to be folded towards and overlap slightly with one another and then to be rolled into the finger roll.

In order to produce that edible food product automatically, in one embodiment, the apparatus comprises a supporting elongated frame structure having a continuous conveyor system mounted thereto. Sequentially arranged along the length of the frame structure are a plurality of assemblies or stations, the first of which is the dough sheet feeding and loading mechanism of one aspect of this invention, which serves to place the square-shaped sheet of dough on the conveyor in a particular orientation, i.e., as a diamond-shaped sheet of dough. Subsequent assemblies of stations serve to dispense the required food ingredients onto the sheet of dough. Still other assemblies or stations then sequentially serve to fold and overlap the filled sheet of dough to an approximate hexagonal shape and then serve to roll the overlapped-folded, filled sheet of dough into a substantially-cylindrical roll. All these operations are performed on the sheet of dough while it is temporarily stationary, as the sheet of dough is intermittently moved from the forward end to the rearward end of the apparatus. The finger roll is then discharged from the apparatus to a further pressing apparatus, preferably a deep fryer.

To simplify the summary of the interrelationship between the dough sheet feeding and loading mechanism of aspects of this invention and the remainder of the elements of the apparatus of the first embodiment of the invention of the above-identified Canadian Patent No. 1,260,318, the following description relates to various stations wherein a particular action or step takes place.

Station A represents the beginning of the operation and will be known as the forward or front end of the frame structure and station E will represent the rear or back end thereof. Once the apparatus is started, the conveyer of one embodiment of the invention of the above-identified Canadian Patent No. 1,260,318 moves forward where the dough sheet feeding and loading mechanism of one embodiment of this invention (to be described in detail hereinafter) feeds a continuous dough sheet and then cuts it into individual sheets of dough and deposits flat sheets of dough onto the conveyor in a particular orientation. The conveyer moves forward and stops at station B and a first set of foodstuff ingredients, e.g. egg mixture and tomato paste are dispensed on the sheet of dough (in a manner to be described hereinafter), by means of a dispensing device (to be described in greater detail hereinafter).

The conveyor again moves forward, passing the sheet of dough with the first series of foodstuff ingredients thereon, to stop upon reaching station C. At this station, a second series of foodstuff ingredients, e.g. pepperoni, is sliced and loaded onto the sheet of dough by means of a pepperoni slicing and loading device (to be described in greater detail hereinafter).

The conveyer moves forward again to stop upon reaching station D. At this station, a third series of foodstuff ingredients, e.g. cheese, is sliced and loaded onto the sheet of dough by means of a cheese slicing and loading device (to be described in detail hereinafter).

The conveyer moves forward again, to stop at station E. Station E is a dough folding station where the diamond-shaped sheet of dough, filled along its transverse axis is first held down at its opposed longitudinal corners, and then its two diametrically-opposed exposed transverse corners are folded over (by a dough folding device to be described in greater detail hereinafter) so that their spices overlap slightly at the center of the dough sheet, and so that the folded-over portions adopt a slightly-tapered, but generally hexagonally-shaped, configuration.

Following this operation, the conveyer is then moved to stop at station E, where the folded-over sheet of dough is gripped and rolled by the two fingers or the single finger of rolling devices (to be described in greater detail hereinafter).

Then the product i.e. the finger roll so formed is discharged, and preferably, is fed to a second conveyor, and then to a deep frying apparatus (which does not form a part of the present invention).

Various synchronizing means are included in this first embodiment of the invention of the above-identified Canadian Patent No. 1,260,318 so as to provide the necessary sequence of start-and-stop movement of the conveyor, coordinated with the actuation of each of the devices at each of the processing stations. Such synchronization means can be in the form of limit switches, or, preferably includes various motors controlled by a specially written software program in a microprocessor.

In order to produce that product automatically, in a second embodiment, the apparatus comprises a supporting frame structure; a conveyor system supported thereon, the conveyor system comprising a rotary table rotationally mounted on the supporting frame structure, the rotary table rotationally mounted on the supporting frame structure, the rotary table being adapted to convey material thereon at a discrete location along the circumference of the rotary table along a circular path past a plurality of work stations, the first of which is the dough sheet feeding and loading mechanism of one aspect of the present invention which serves to place the square-shaped sheet of dough on the conveyor in a particular orientation, i.e., as a diamond-shaped sheet of dough. Intermittent rotating means one provided for intermittently rotationally moving the rotary table and hence at least one discrete location thereon from one work station to the next, downstream, work station. Subsequent assemblies of such stations serve to dispense the required food ingredients onto the sheet of dough. Still other assemblies, or stations, then sequentially serve to fold and overlap the filled sheet of dough into a substantially-cylindrical roll. All these operations are performed on the sheet of dough while it is temporarily stationary, as the sheet of dough is intermittently moved around the circumference of the rotary table. The finger roll is then discharged from the apparatus to a further pressing apparatus, preferably a deep fryer.

To simplify the summary of the interrelationship between the dough sheet feeding and loading mechanism of one embodiment of the invention and the remainder of elements of the apparatus of the second embodiment of the invention of the above-identified Canadian Patent No. 1,260,318, the following description relates to various stations wherein a particular action or step takes place.

Station A represents the beginning of the operation and will be known as the forward or front end of the frame structure and station E will represent the rear or back end thereof.

Once the apparatus is started, the conveyer, i.e., the rotary table of this second embodiment of the invention of the above-identified Canadian Patent No. 1,260,318 is rotated where the dough sheet feeding and loading mechanism of one embodiment of this invention (to be described in detail hereinafter) feeds a continuous dough sheet and then cuts it into individual sheets of dough and finally deposits that flat sheet of dough onto the dough-tray forming part of the rotary table, in a diamond-shaped or indentation. The rotary table is then rotated and stops at station B and a first set of foodstuff ingredients, e.g. egg mixture and tomato paste are dispensed on the dough sheet (in a manner to be described hereinafter), by means of a dispensing device (to be described in greater detail hereinafter).

The rotary table is then rotated passing the sheet of dough with the first series of foodstuff ingredients thereon, to stop upon reaching station C. At this station, a second series of foodstuff ingredients, e.g. pepperoni, is sliced and loaded onto the dough sheet by means of a pepperoni slicing and loading device (to be described in greater detail hereinafter).

The rotary table is then rotated to stop upon reaching station D. At this station, a third series of foodstuff ingredients, e.g. cheese, is sliced and loaded onto the dough sheet by means of a cheese slicing and loading device (to be described in detail hereinafter).

The rotary table is then rotated to stop a station E. Station E is a dough folding machine where, in one embodiment, the diamond-shaped sheet of dough, filled along its transverse axis is first held down at its opposed longitudinal corners, and then its two diametrically-opposed exposed transverse corners are folded over (by a dough folding device to be described in greater detail hereinafter) so that their apices overlap slightly at the centre of the dough sheet, and so that the folded-over portions adopt a slightly-tapered, but generally hexagonally-shaped, configuration.

Following this operation, the rotary table is again rotated to stop at station E, where the folded-over dough sheet is gripped and rolled by the two fingers or the single finger of novel rolling devices (to be described in greater detail hereinafter).

Then the novel product i.e., the finger roll so formed is discharged, and preferably, is fed to a second conveyor, and then to a deep frying apparatus (which does not form a part of the present invention).

Various synchronizing means are included in this second embodiment of the invention of the above-identified Canadian Pat. No. 1,260,318 so as to provide the necessary sequence of start-and-stop movement of the conveyor, coordinated with the actuation of each of the devices at each of the processing stations. Such synchronization means can be in the form of limit switches, or, preferably includes various motors controlled by a specially written program in a microprocessor.

Figure 1:
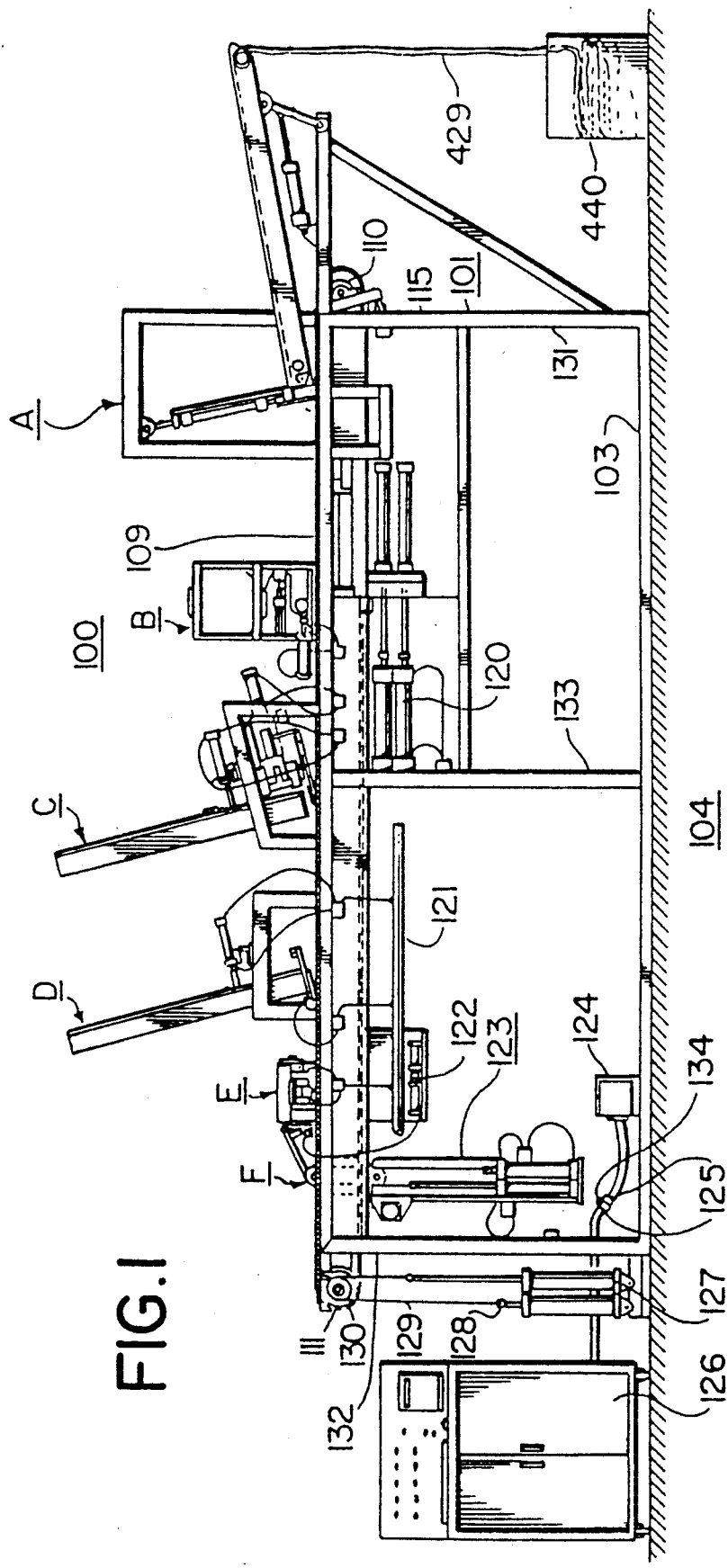
FIG. 1 is a side elevational view of the food production apparatus disclosed in the above-identified Canadian Patent No. 1,260,318 modified by including the dough sheet feeding and loading mechanism of one embodiment of this invention.
Figure 2:
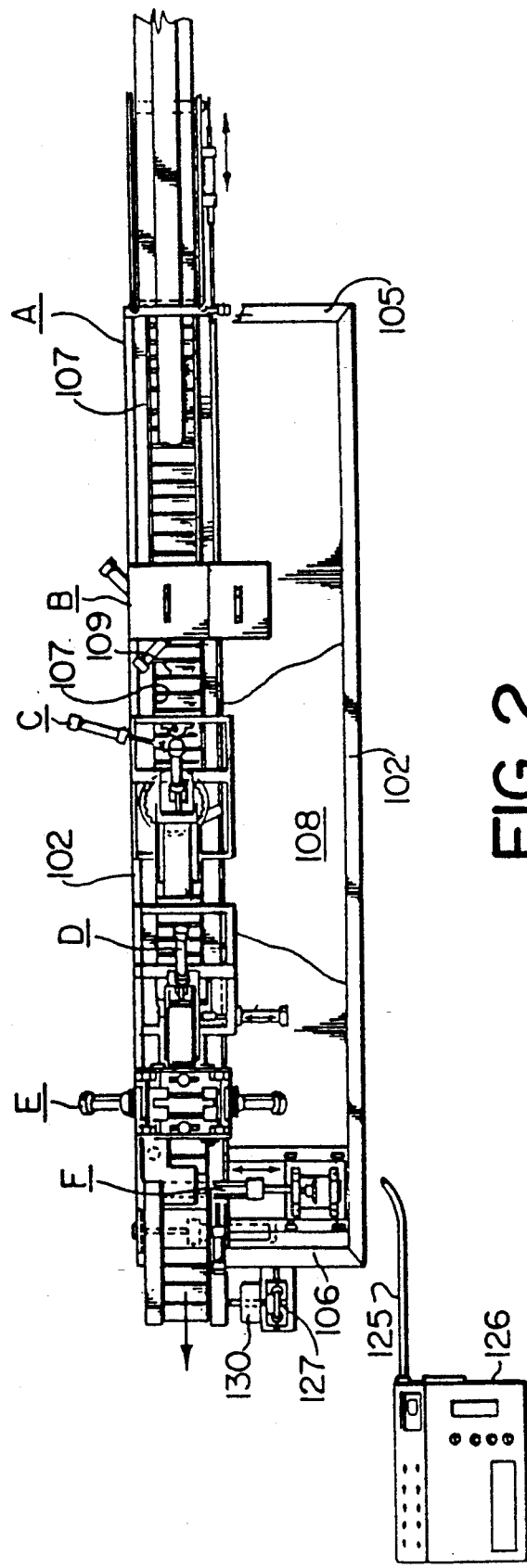
FIG. 2 is a top plan view of the food production apparatus of the first embodiment of the invention shown in FIG. 1.

As seen generally in FIGS. 1 and 2, the apparatus 100 of the first embodiment of the invention of the above-identified Canadian Pat. No. 1,260,318 is built around a main frame 101 including a pair of upper, spaced-apart parallel longitudinal beams 102, a pair of lower, spaced-apart longitudinal bases 103, resting on a floor 104, a front vertical leg 131, a rear vertical leg 132 and an intermediate vertical leg 133, a pair of upper, transverse, spaced-apart connecting fore 105 and aft 106 end transverse beams and a pair of lower, transverse, spaced-apart, connecting fore and aft end transverse beams (not seen). Mounted within a longitudinal slot 107 in the upper table 108 supported on the top of the main frame 101 is a controlled, intermittently driven conveyor 109, entrained around a fore over-ride clutch, chain-driven, drive sprocket 110 and an aft idler and tensioner sprocket 111.

The main frame 101 serves not only to support the conveyor 109, and to provide a base table 108 for the superposed processing stations (to be described in detail hereinafter), but also to provide a site below table 108 for the operating mechanisms.

At the aft end, it provides the site for the air supply manifold 121 for the pneumatic cylinders (to be described later) which operate the various processing stations. There is also provision for a depending carriage 123 which moves the operating members at the product rolling station (to be described later). There is also provision for the main junction box 124 and the plugs 134 connected by line 125 to the console 126 for the preferred microprocessor which controls the synchronized operation of the apparatus. At the aft end of the framework 101 are a pair of tandemly operated pneumatic cylinders 127, the rod ends 128 of which are tied to a chain 129 entraining a sprocket 130 controlling the idler and tensioner sprocket 111. For aesthetic appearance, the main frame is also enclosed by a skirt (not seen) at the two lateral sides and at the fore and aft ends.

As mentioned before, the main frame 101 provides the base 108 for the frames (to be described later) supporting the various processing stations (to be described later).

Figure 3A:
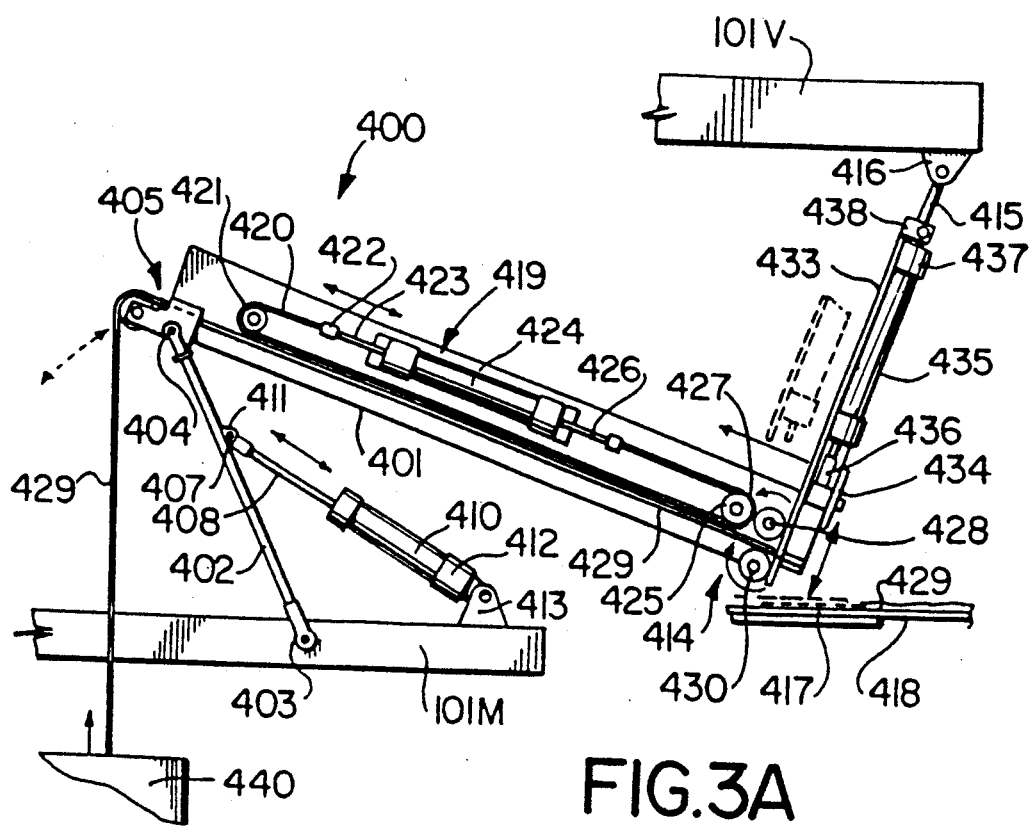
FIGS. 3A and 3B are side elevational views of the dough sheet feeding and sheet of dough cutting and loading mechanism shown in FIGS. 1 and 2, i.e.
Figure 3B:
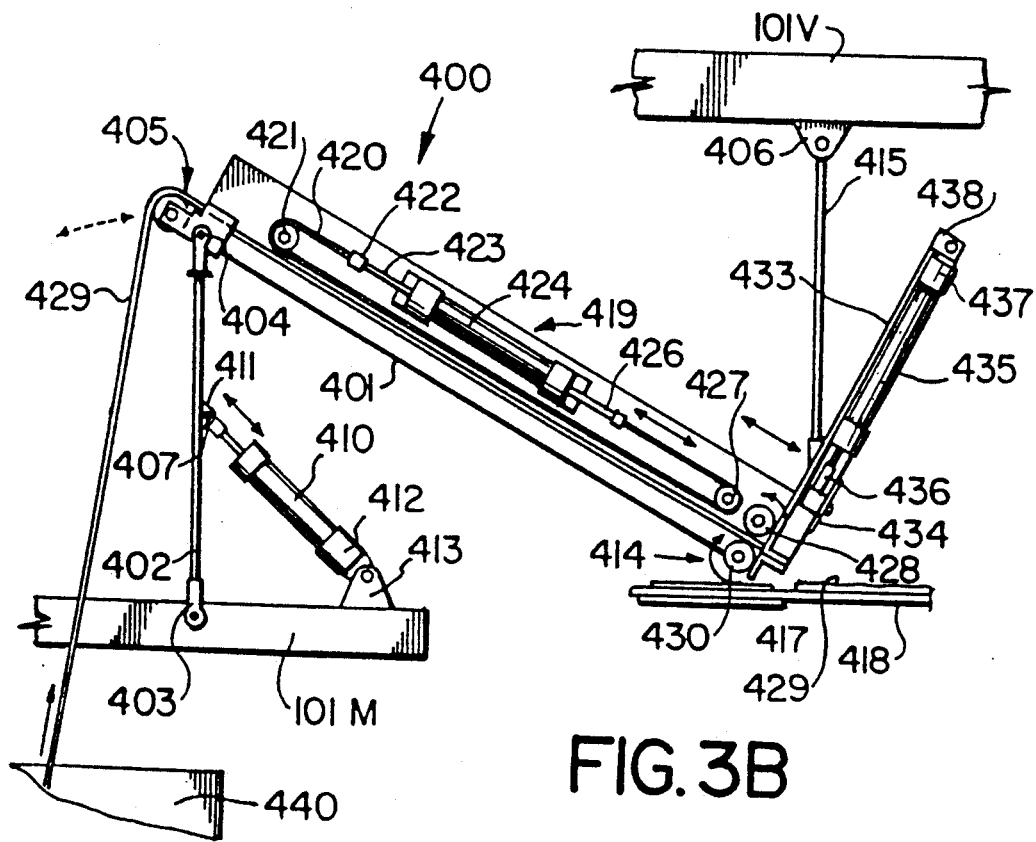

The processing stations mounted above the conveyor are:

Station A Dough Sheet Loading, Unloading and Feeding Station;
Station B First (Egg Mixture & Tomato Paste) Foodstuff Ingredient Station;
Station C Second (Pepperoni Loading) Foodstuff Ingredient Station;
Station D Third (Cheese Loading) Foodstuff Ingredient Station;
Station E Filled Dough Sheet Folding Station; and
Station F Filled, Folded Dough Sheet Rolling Station;

As seen in FIGS. 3A and 3B, the dough sheet feeder/cutter 400 of one embodiment of this invention includes a feed tray 401 supported above the machine framework 101M by means of a pivotally-mounted upstanding arm 402. The lower end 403 of the arm 402 is pivotally secured to the machine framework 101M, while the upper end 404 of the arm 402 is pivotally secured to the upper end 405 of the feed tray framework 401. The arm 402 is pivotally connected adjacent its mid-point 407 to the rod end 408 of a pneumatic cylinder 410, at an ear 411 secured to the arm 402. The cylinder end 412 of the pneumatic cylinder 410 is pivotally connected to an ear 413 secured to the machine framework 101M.

The lower end 414 of the feed tray framework 401 is supported by a pivotally mounted depending arm 415, pivoted to an ear 416 secured to the machine overhead frame 101V, so that the lower end 414 of the feed tray 401 is adjacent the sheet of dough tray 417 on the conveyor 418.

The feed tray 401 is provided with a feeding mechanism 419 including a chain drive 420 entraining an upper drive sprocket 421, the free upper end 422 of the chain drive 420 being secured to the upper rod end 423 of a double acting air cylinder 424. The chain drive 420 also entrains an indexing clutch drive 425 being secured to the lower rod end 426 of the double acting air cylinder 424. The lower end 427 of the chain drive 420 is in driving contact with an upper dough sheet roller 428 which is adapted to be in driving contact with a continuous dough sheet 429. A lower dough sheet roller 430, driven in a direction opposite to the direction of the upper dough sheet roller 428 is also adapted to be in driving contact with a continuous dough sheet 429.

The rollers 428, 430 are rotated by means of a single double-acting, double-rod-end pneumatic cylinder 424, the rod ends 426 of which being tied to opposite ends of the chain drive 420, so that operation of the cylinder results in rotation of the sprocket 421 and clutch drive 425.

Secured to the lower end of the depending arm 415 is a framework 433 supporting a guillotine knife blade 434. The guillotine blade 434 is actuated by the power stroke of a pneumatic cylinder 435, the rod end 436 of the cylinder 435 being secured to the guillotine blade 434, the cylinder end 437 being secured to the upper end 438 of the framework 433.

In operation, the continuous dough sheet is pulled up out of the handling container and is pulled along the feed tray by means of the double rollers until a predetermined extent of the continuous dough sheet extends beyond the feed tray. At this time the sheet of dough tray of the conveyor is under the overhanging continuous dough sheet.

At this precise moment, the air cylinder is actuated to the power stroke, thereby urging the feed tray downwardly and rearwardly. Also at this precise moment, the guillotine knife operating cylinder is actuated so that the power stroke thereof severs the continuous dough sheet to provide an individual sheet of dough laid across the dough tray of the conveyor in a diamond orientation.

These two actions take place while the conveyor is stationary.

Then the conveyor is moved again. The guillotine knife operating cylinder is actuated to its return stroke and the knife framework is urged rearwardly to its "out" position. The feed tray operating cylinder is actuated to its return stroke, to move the feed tray frame upwardly and forwardly. It is to be observed that during this stop-and-start operation of the actuating cylinders, the continuous dough sheet is being continuously pulled out of the handling container.

The sequence of operations is then repeated a plurality of times, controlled by the synchronous timing mechanisms.

The square-shaped sheets of dough thus produced by the apparatus of one embodiment of this invention are placed on the conveyor in a particular orientation, e.g. they look like a diamond when viewed from above.

Station B, shown in FIG. 4, FIG. 5 and FIG. 6 includes a main frame 601 supporting an upper sub-station 602, an intermediate sub-station 603 and a lower sub-station 604. The upper sub-station includes a tank 605 for tomato paste or sauce, and a tank (not seen) for a beaten egg mixture. Each tank leads to a premeasuring unit including an entry chamber 606, connected by a line 607 to the tank, e.g., 605 above. Each entry chamber 606 is connected by its associated T-union 608 to an outlet chamber 609 connected to a dispensing plunger mechanism in a dispensing chamber 611 which is operated by a pneumatic cylinder 610. The power stroke of the plunger mechanism is pre-set to dispense the exact amount of the tomato paste sauce or the egg mixture respectively, through its associated dispensing chamber 611. Each of the entry chambers 606 and the outlet chambers 609 is provided with a valve, operated in synchronism by respective valve cylinders 612. When the dispensing mechanism is operating to dispense tomato paste or egg mixture respectively through dispensing chamber 611, the entry valve to the entry chamber 606 operated by the entry cylinders is closed, while the dispensing valve from the outlet chamber 609 operated by the dispensing cylinders is open; and vice versa.

The tomato paste premeasuring station has a feed line 613 from its associated dispensing chamber 611 to a tomato paste spreader 614 which is secured to the rod end 615 of a transversely-mounted pneumatic cylinder 616.

The egg-mixture premeasuring station has an associated feed line 617 from its associated dispensing chamber 611 to each of two egg solution spreaders 618. Each spreader 618 is at the rod end 619 of a respective one of two mutually perpendicularly-oriented pneumatic cylinders 620. The cylinders 620 are oriented along the two leading edges of the diamond-shaped sheet of dough.

The diamond-shaped sheet of dough now has a rectangular area of tomato paste spread across its longest transverse axis, and also has a band of egg mixture solution along its two front or leading edges.

Figure 7:
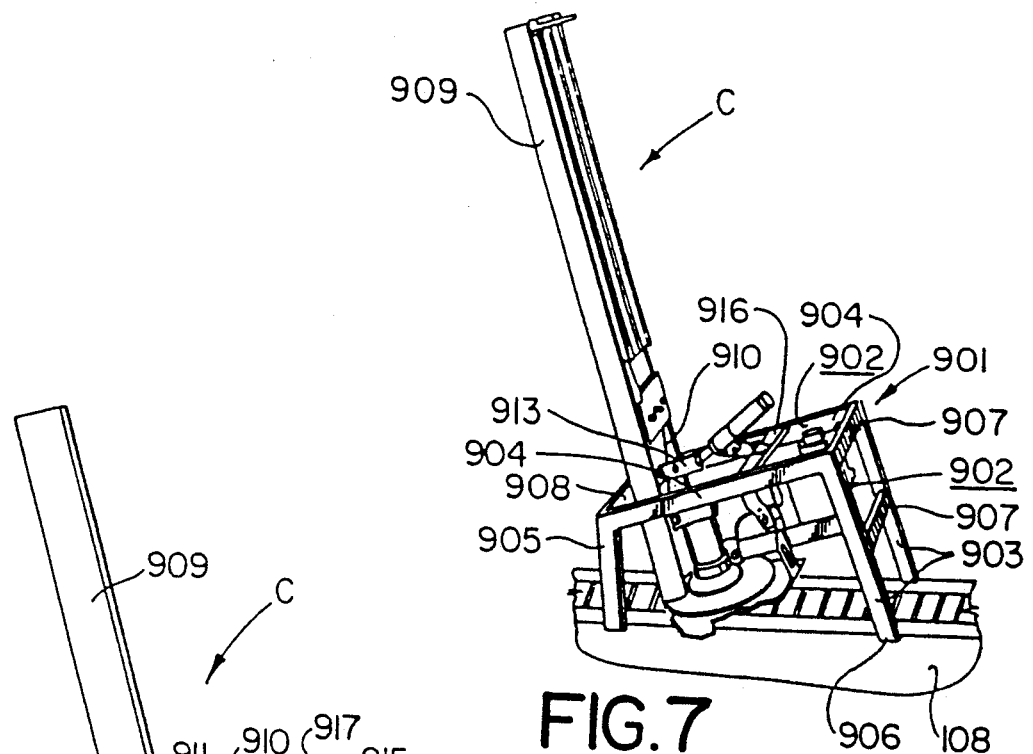
FIG. 7 is a perspective view of a pepperoni slicing and loading station of the food production apparatus of the first embodiment of the invention of the above-identified Canadian Patent No. 1,260,318 and shown in FIGS. 1 and 2.
Figure 8:
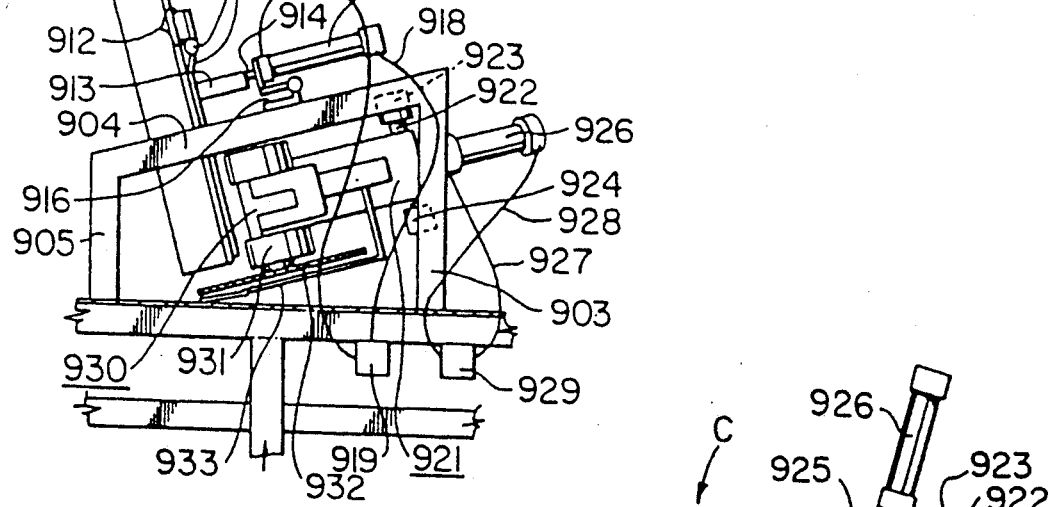
FIG. 8 is a side elevational view of the pepperoni slicing and loading station shown in FIG. 7.
Figure 9:
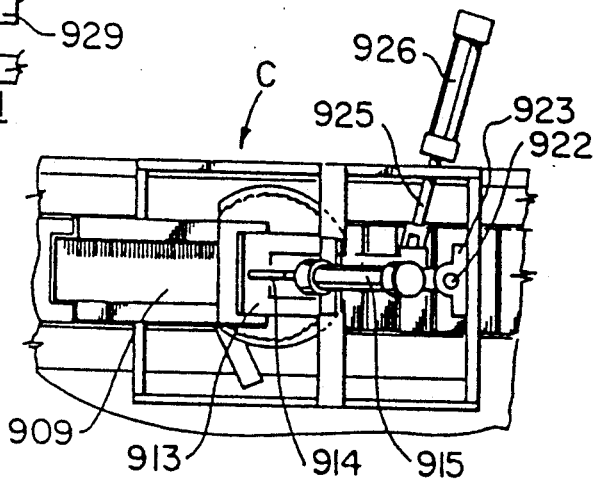
FIG. 9 is a top plan view of the pepperoni slicing and loading station shown in FIG. 7.

The pepperoni slicing loading station C shown in FIG. 7, FIG. 8 and FIG. 9 includes a three dimensional frame 901 including a pair of side frame members 902 constituted by a fore brace 903, a rearwardly and downwardly sloping longitudinal support member 904 and an aft shorter brace 905, the two side frame members being secured at their lower ends 906 to the table 108, and being interconnected at their fore and aft upper ends by a pair of force 907 and a single aft 908 cross members, respectively.

An elongated holding tray 909 is secured to the side frame members 904, the holding tray 909 being for the purpose of supporting a plurality, e.g. three pepperoni sticks. A power-operated brake flap 910 is hingedly secured by transverse pivot 911 to a mid portion 912 of the holding tray 909 and is actuated to open (to allow entry of the pepperoni sticks) and to close (to allow gripping of the pepperoni sticks in an upright position) by means of a bar 913 secured to the rod end 914 of a pneumatically-operated cylinder 915 secured to a support member 916 of the frame 901. The cylinder 915 is operated by air lines 917, 918 from box 919.

A swingable carriage 921 is mounted to the fore end of the side frame members. Such swingable carriage 921 is secured to a rod 922, which is supported on an upper 923 and lower 924 pair of bearing mounts. The carriage is adapted to be intermittently swivelled by means of connection to the rod end 925 of a pneumatic cylinder 926.

A slicing arrangement 930 is secured to the swingable carriage 921, the slicing arrangement 930 including a pneumatic motor 931 which is activated intermittently to rotate a cutter blade 932. The thickness of the pepperoni sliced by the cutter blade 932 is controlled by a blade depth gauge plate 933. The cylinder is operated by air lines 927, 928, from box 929.

The cheese slicing and loading station D shown in FIG. 10, FIG. 11 and FIG. 12 includes a three dimensional frame 1201 including a pair of side frame members 1202, each constituted by a fore upright leg 1203, a longitudinal support member 1204 and an aft upright leg 1205, the two side frame members being secured at their lower ends 1206 to the table 108, and being interconnected at their fore and aft upper ends by fore 1206 and aft 1207 transverse cross members, respectively.

An elongated holding tray 1208 is secured to the side frame members, the holding tray 1208 being for the purpose of supporting a square-cross section bar of cheese (not seen). A power operated brake flap 1210 is hingedly secured at transverse pivot 1211 to a mid portion 1212 of the holding tray 1208 and is actuatable to open (to allow entry of the cheese) and to close (to allow gripping of the cheese in an upright position) by means of a bar 1213 secured to the rod end 1214 of a pneumatically-operated flap cylinder 1215 secured by brace 1216 to an intermediate transverse cross bar 1231 of the frame 1201. Cylinder 1215 is operated by air lines 1217a, 1217b from box 1218, connected by air line 1219 to air conduit 121.

A pair of spaced-apart transverse tracks, namely a fore, upper track 1220 and a rear, lower track 1221 is secured to the leading and trailing edges respectively of a rearwardly downwardly slopping transverse carriage 1222. A transverse cutter blade 1223 is reciprocally- and rollably-mounted in the tracks 1220, 1221 by means of rollers 1224. The blade 1223 is reciprocated across the transverse width of the conveyor 109 by means of connection to the rod end 1225 of a pneumatical cylinder 1226. Cylinder 1226 is operated from air line 1227, from box 1228 connected by air line 1229 connected to air conduit 121. A manually-adjustable, thickness-adjusting plate 1230 is disposed below the cheese slicing blade.

Figure 13:
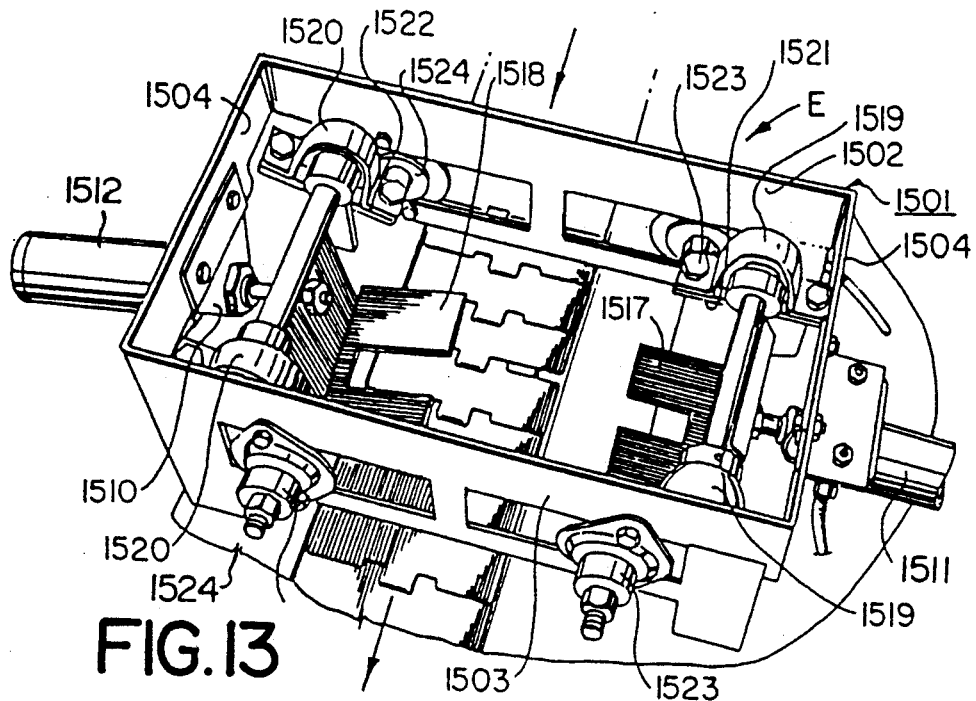
FIG. 13 is a perspective view of a dough folding station of the food production apparatus of the first embodiment of the invention of the above-identified Canadian Patent No. 1,260,318 and shown in FIGS. 1 and 2.
Figure 14:
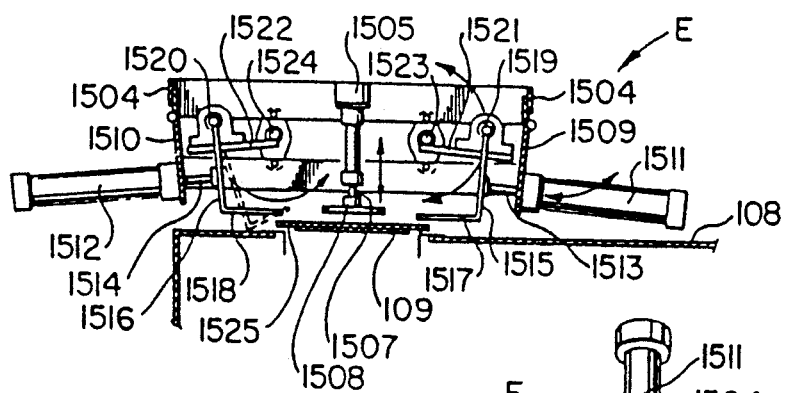
FIG. 14 is a transverse section through the table and the conveyor of the dough folding station shown in FIG. 13.
Figure 15:
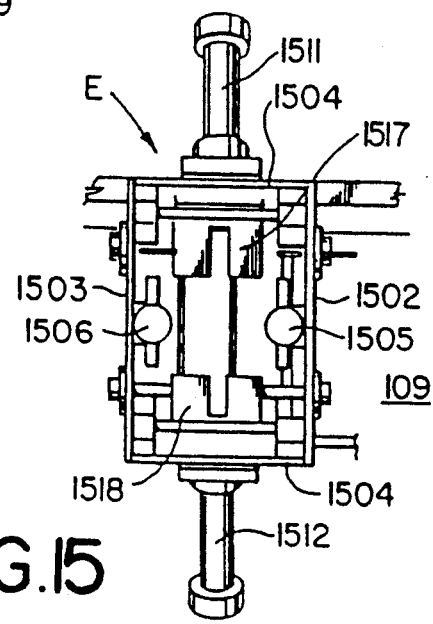
FIG. 15 is a top plan view of the dough folding station shown in FIG. 13.

The dough folder station E, shown in FIG. 13, FIG. 14 and FIG. 15 includes an open top and open bottom housing 1501 including upstream wall 1502 and downstream wall 1503 as well as two lateral and transverse walls 1504 disposed atop the table 108 and straddling the conveyor 109. Within the housing 1501 are a pair of vertically-disposed pneumatic cylinders 1505, 1506 disposed vertically above the central longitudinal axis of the conveyor. The rod ends 1507 of each cylinder carry a holddown plate 1508 while the aft plate only also carries an impression stamp (not shown).

On each side of the conveyor 109 and at the marginal side edges 1504 of the housing 1501 is a hingedly-mounted plate 1509, 1510 to which the cylinder end of a pneumatic cylinder 1511, 1512 is secured. The rod end 1513, 1514 of the cylinder 1511, 1512 is secured to a downwardly extending folder arm 1515, 1516 to which are attached lower, inwardly-extending spaced-apart folder fingers 1517, 1518. The upper end of the folder arm is pivotally secured to an outboard pivot bearing 1519, 1520 mounted on a mounting plate 1521, 1522, which itself is pivotally secured to an inboard pivot bearing 1523, 1524.

Figure 16:
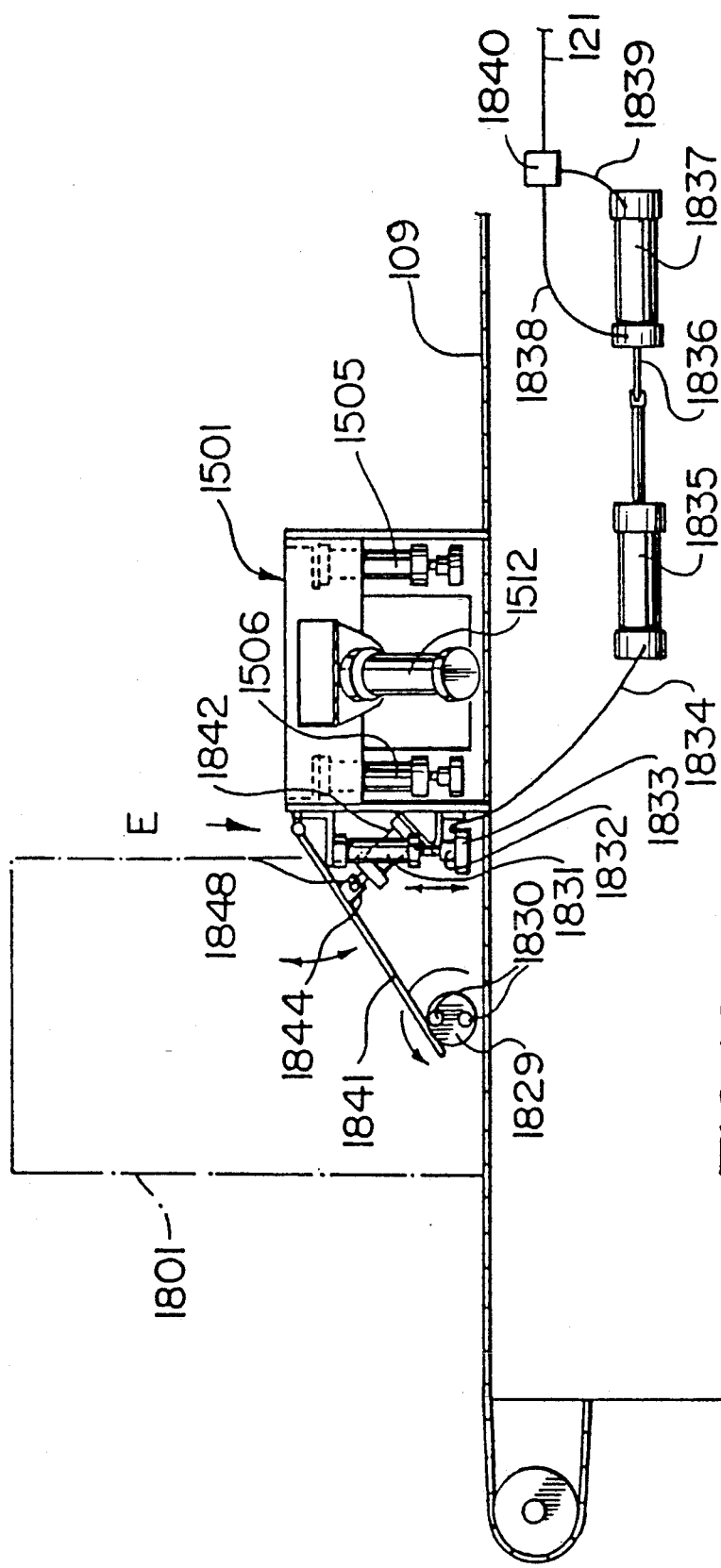
FIG. 16 is a longitudinal section through the table and the conveyor of a dough folding station and a downstream rolling station of the first embodiment of the invention of the above-identified Canadian Patent No. 1,260,318 and shown in FIGS. 1 and 2.
Figure 20:
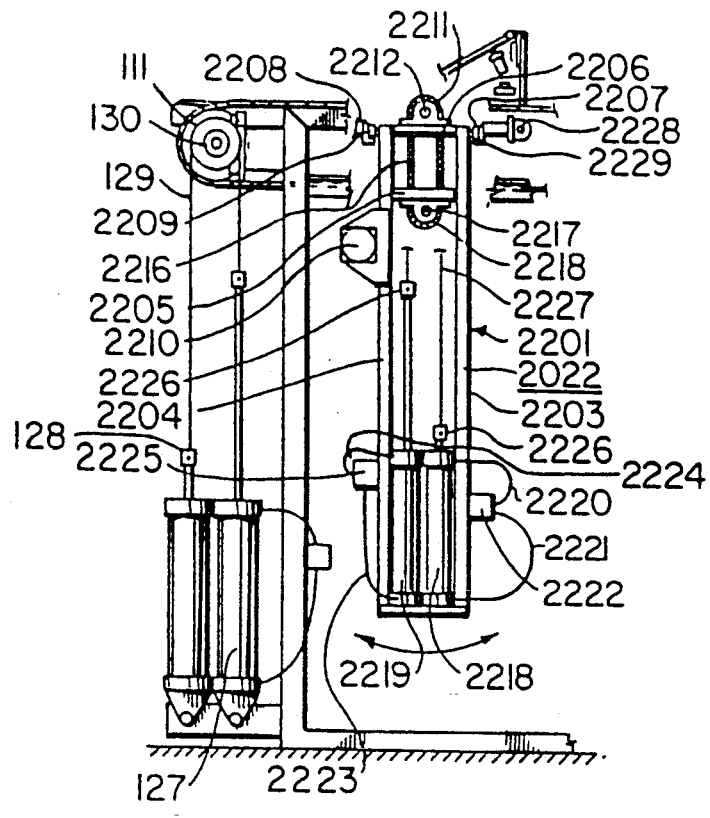
FIG. 20 is a side elevational longitudinal view of the end of the conveyor and of the carriage shown in FIG. 19.

In one alternative of a rolling station F, shown in FIG. 16, FIG. 17 and FIG. 18, an upwardly standing three dimensional frame 1801 is provided including a pair of lateral frameworks 1802, each including a fore (not seen) and aft 1804 upright column and an upper longitudinal cross-piece 1805, the pair of lateral frameworks 1802 being erected on one side of the conveyor with the base 1806 of the upright columns 1804 being secured to the table 108, and with the upper ends of the upright columns 1804 interconnected by fore 1807, and aft 1808 upper transverse bars.

Forward and aft longitudinally-spaced-apart pairs of upper and lower transverse, vertically-spaced-apart rails 1809 extend transversely across the lateral framework 1801 near the bottom thereof. A vertically-upright carriage 1810 is rollably mounted between the rails 1809 by means of rollers 1850 and is reciprocally-movable transversely along the rails 1809 by means of a pneumatic cylinder 1811, the end of the rod end 1812 thereof being secured to the outboard one of the lateral frameworks 1802.

Mounted on the carriage 1810 is a driven mechanism comprising a pair of tandemly-operated, vertically-oriented, pneumatic cylinders 1813, 1814, the rod ends 1816 of which each being tied to a chain 1817 which entrains a sprocket 1818 and also entraining a speed-reduction sprocket 1819, that sprocket 1819 being provided with an over-riding clutch 1820 for indexing the rolling fingers 1830. The speed-reduction sprocket 1819 is keyed into a shaft 1815 which is freely rotatably mounted between a pair of spaced-apart bearings 1821, 1822. Shaft 1815 also has keyed thereon a second sprocket 1823, which, in turn, is entrained by a second drive chain 1824 which entrains a finger-drive sprocket 1825. The finger drive sprocket 1825 is keyed to a shaft 1826 which is freely rotatably mounted between a pair of spaced-apart bearings 1827, 1828. The inboard end of the shaft 1826 (which is adapted to extend over the conveyor 109) is provided with a mounting cylinder 1829 fitted with a pair of rolling fingers 1830 which are adapted to be moved laterally by means of the carriage 1810 to extend over the conveyor 109.

As seen more clearly in FIG. 16, secured to the downstream end of the dough folder housing 1501 but upstream of the rolling station F is a vacuum pad cylinder 1831, the rod end 1832 of which is provided with a vacuum lift-up pad 1833 actuatable by being connected to vacuum line 1834 from cylinder arrangement 122 (FIG. 1) comprising a vacuum cylinder 1835 operated by the rod end 1836 of a pneumatic cylinder 1837, and fed with air through lines 1838, 1839 from box 1840 via air conduit 121. This actuation cause the lift-up pad 1833 to lift the trailing longitudinal edge of the overlapped-folded, foodstuff-containing dough sheet 1525.

Also connected to the downstream end of the dough folder housing 1501 is downwardly and rearwardly extending pressure plate 1841, biased downwardly by cylinder 1842, the rod end 1848 of which is connected to an ear 1844 on the pressure plate 1841 to hold the overlapped-folded dough sheet while it is being rolled by the rolling fingers 1830.

Also at the downstream end of the rolling station E (as seen in FIG. 19) and secured to the table 108 on one side of the conveyor 109 is an unloading cylinder arrangement 1845 including an unloading cylinder 1846, which is secured to the table 108, with the rod end 1847 thereof being secured to an unloading finger 1848.

Figure 21:
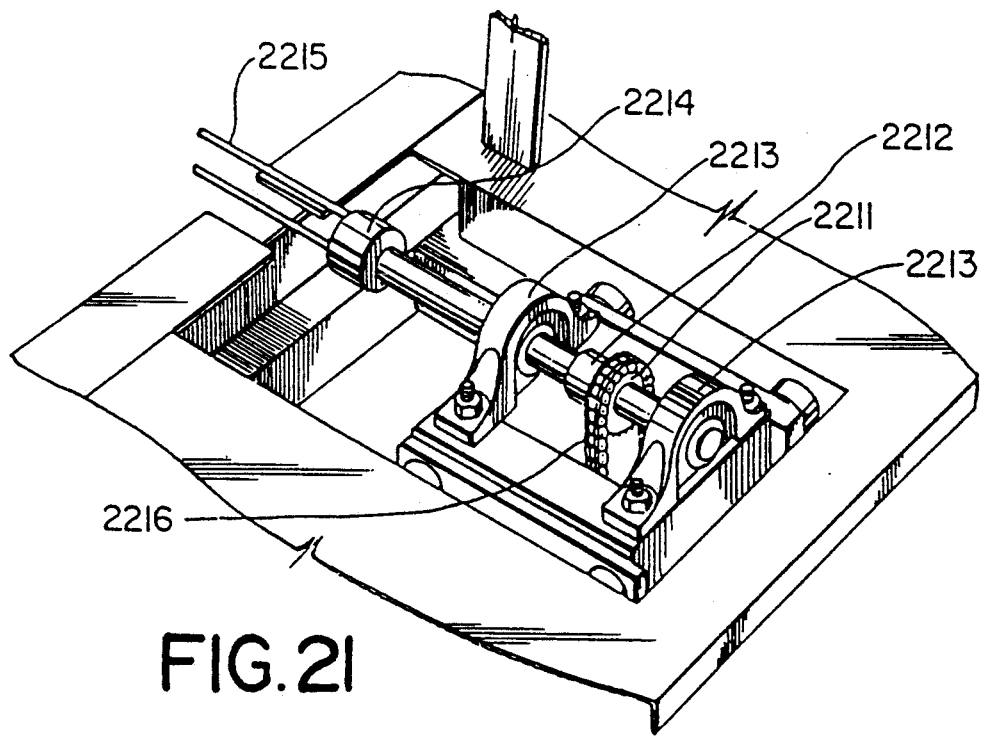
FIG. 21 is a perspective view of a roller carriage forming part of a second alternative rolling station of the first embodiment of the invention of the above-identified Canadian Patent No. 1,260,318 and shown in FIGS. 1 and 2.
Figure 22:
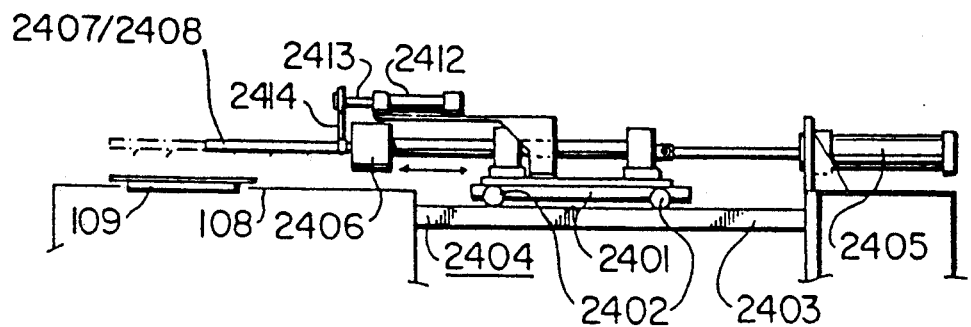
FIG. 22 is a side elevational transverse view of the second alternative rolling station shown in FIG. 21.
Figure 23:
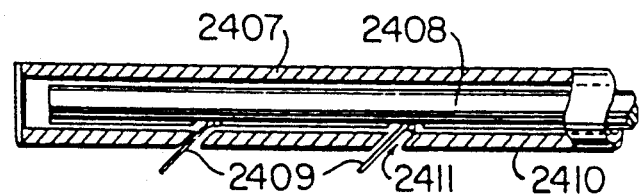
FIG. 23 is an enlarged view partially sectionalized of the single rolling finger of FIG. 20 at the rolling station shown in FIGS. 21 and 22.

In a second alternative of the rolling station, F, shown in FIG. 21, FIG. 22, and FIG. 23, an inverted carriage 2201 is provided. The carriage 2201 includes a pair of lateral frameworks 2202, each including a fore 2203 and aft 2204 upright column, an intermediate upper longitudinal cross-piece 1205, and an upper longitudinal cross-piece 1206.

A fore and aft pair of longitudinally-spaced-apart rails 2207, 2208 extend transversely across the conveyor 109 thereof. This vertically-depending carriage 2201 is thus rollably mounted by means of wheels 2209 below the table 108 between the rails 2207, 2208 and is reciprocally movable transversely across the conveyor by means of a pneumatic cylinder 2210.

The rotation drive mechanism in this second embodiment includes an upper, drive sprocket 2211 keyed to a shaft 2212 extending transversely across the conveyor 109, the shaft 2212 being rotationally mounted between spaced-apart bearings 2213 and being provided with a mounting cylinder 2214 fitted with a pair of fingers 2215. The upper sprocket 2211 is entrained by a drive chain 2216 which also entrains a lower drive sprocket 2217, whose shaft 2218 is rotationally mounted on its associated bearing. The drive sprocket 2217 is driven by a drive mechanism operated by two tandemly operated pneumatic cylinders 2218, 2219 driven in tandem by being connected to air lines 2220, 2221 at box 2222 and air lines 2223 and 2224 at box 2225. The free end of the rod 2226 of each cylinder 2218, 2219 is tied to a drive chain 2227 entraining a master drive sprocket (not shown) also keyed to the same shaft 2218 as the lower drive sprocket 2217. As stated, the cylinders 2218, 2219 are operated in tandem, with the power stroke of one cylinder being synchronized with the return stroke of the other cylinder.

This embodiment of a finger rolling station F is provided with the same finger-rolling assisting and discharging stations described above with respect to FIG. 17 and FIG. 18.

A third embodiment of a finger rolling and product unloading station F is shown in FIG. 22 and FIG. 23. This station includes an upper carriage 2401 provided with wheels 2402 adapted to roll along a bed 2403 provided in a transverse extension 2404 of the table 105. The carriage 2401 is provided with an operating system namely pneumatic cylinder 2405 which is actuated to roll an extension of the carriage 2401 transversely across the conveyor 109. The carriage 2401 also includes an extension 2406 connected to an outer sleeve 2407/inner rod 2408 combination. The inner rod 2408 is provided with a plurality of high tension wire prongs 2409 which are adapted to lie flush with the outer surface 2410 of the outer sleeve 2407 at a like plurality of holes 2411 drilled at an angle through the outer sleeve 2407 when the outer sleeve 2407 is extended, and to project completely out through those holes 2411 (as shown) when the outer sleeve 2407 is retracted. A pneumatic cylinder 2412 is mounted in the carriage 2401, and the rod end thereof 2413 is provided with an operating mechanism 2414 to extend and retract the outer sleeve.

The finger-rolling assisting stations (not shown) used with this embodiment is the inverse of the one used with the first two embodiments and shown in FIGS. 16 and 19. The pressure plate assembly 1841 and the dough sheet lifter assembly 1831 are all the same. However, the unloading assembly 1845 shown in FIG. 28 differs from that shown in FIG. 18 in that, instead of a single unloading finger 1848, there are two spaced-apart unloading fingers, looking much like rolling fingers 1830 shown in FIG. 18 or unrolling fingers 2215 shown in FIG. 21.

If it is desired to produce a meat-filled, rolled-up, overlapped folded-over, dough product, e.g. a taco, or an egg roll, then the processing stations for loading tomato paste, pepperoni, and cheese are replaced by an egg mixture, leading edges-coating station and by a ground product, e.g. ground or minced meat loading station. The station B for applying the egg mixture to the leading edges of the diamond-shaped dough sheet is still required and operates as previously described.

Figure 24:
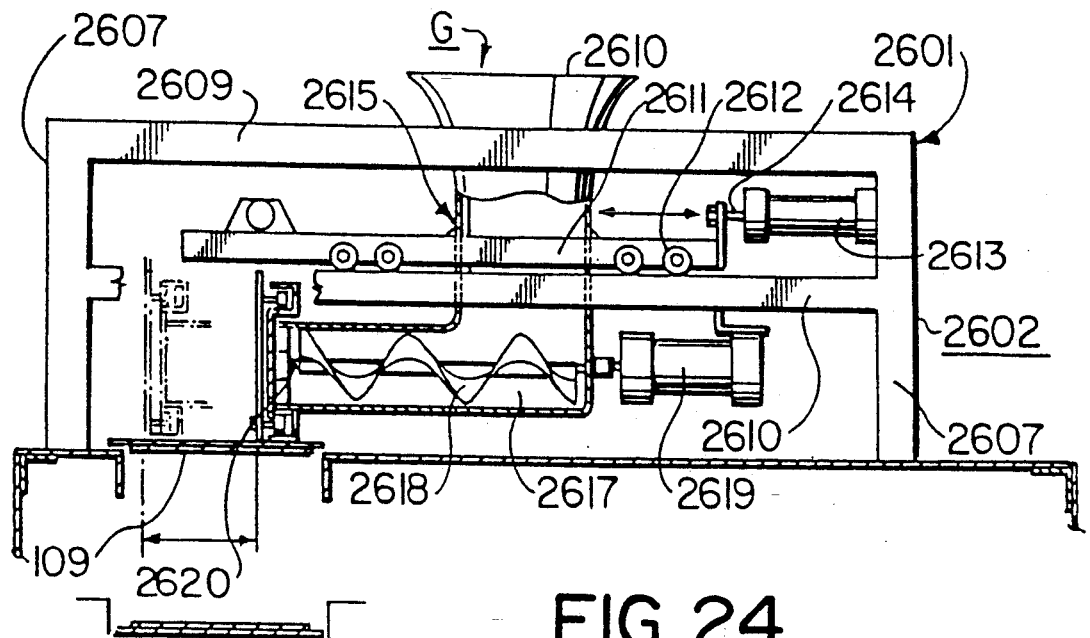
FIG. 24 is a transverse section showing a second alternative foodstuff loading station of a food production apparatus of the first embodiment of the invention of the above-identified Canadian Patent No. 1,260,318 and shown in FIGS. 1 and 2.
Figure 25:
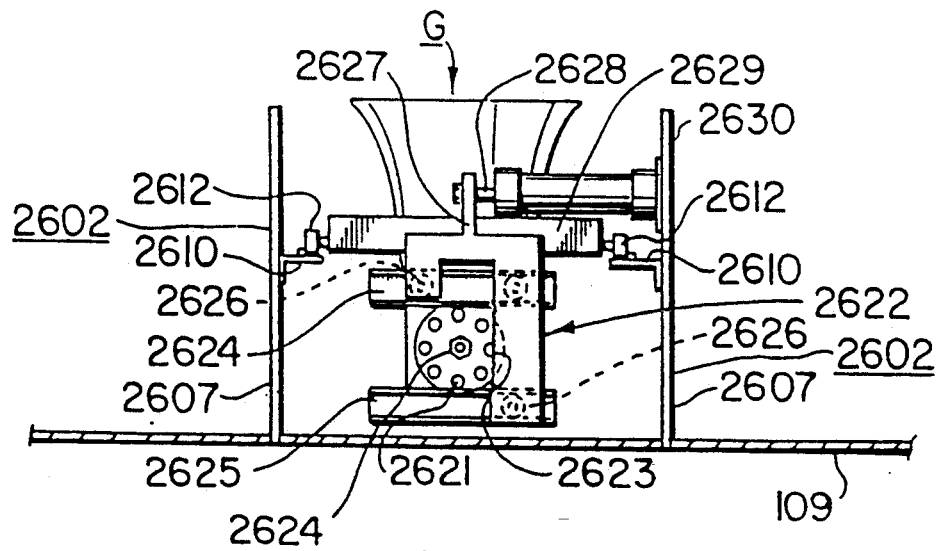
FIG. 25 is a longitudinal elevational view of the foodstuff loading station of FIG. 24.

The meat loading station G shown in FIG. 24 and FIG. 25 includes a main frame unit 2601 including a pair of lateral frames 2602 consisting of a pair of lateral upright legs 2607, an intermediate transverse cross member 2608 an upper transverse cross member 2609. The lateral frames 2602 are disposed astraddle the conveyor 109, with the legs 2607 secured to the table 108. A pair of mid, internal, longitudinal tracks 2610 are also provided.

Disposed within the framework is a transversely-rollable carriage 2611 provided with wheels 2612 rollable on the tracks 2610. A pneumatic cylinder 2613 is secured to one lateral side frame 2607, and the free end of the rod end 2614 thereof is secured to an end of the carriage 2611 to cause the carriage 2611 to oscillate transversely across the conveyor 109.

The carriage 2611 supports a meat grinder or mincer assembly 2615. The meat grinder assembly 2615 includes a vertical funnel 2616 leading to a horizontal, transverse cylindrical auger chamber 2617 provided with a rotatably driven auger 2618. The auger 2618 is driven by means of a pneumatic motor 2619. The downstream end of the auger chamber 2617 is provided with a discharge plate 2620 provided with a plurality of apertures 2621. The discharge plate 2620 is traversedly by a cutting blade assembly 2622 including a blade edge 2623, the assembly being mounted within upper 2624 and lower tracks 2625 by means of rollers 2626 secured to the assembly 2622. The assembly 2622 includes a bracket 2227 to which is secured the free end of the rod end 2628 of a pneumatic cylinder 2629 secured to one of the longitudinally-extending lateral side frame members 2630.

The remaining stations for folding and rolling the filled product are part of the modified apparatus and constituted as previously described and are operated in the same fashion as previously described.

As seen in FIGS. 26–45 which shows another embodiment of the invention of the above-identified Canadian Patent No. 1,260,318, a rotary table 2809 replaces the linear endless conveyor 109 as a conveyor system. Disposed around the outer circumference of the rotary table 2809 are: the dough sheet loading and loading mechanism of one aspect of this invention at STATION A; an egg mixture paste and tomato paste feeder 2811 at STATION B; a pepperoni slicer and loader 2812 at STATION C; a cheese slicer and loader 2813 at STATION D; a loaded sheet of dough folder 2814 at STATION E; and a loaded folded sheet of dough roller 2815 at STATION F.

Figure 26:
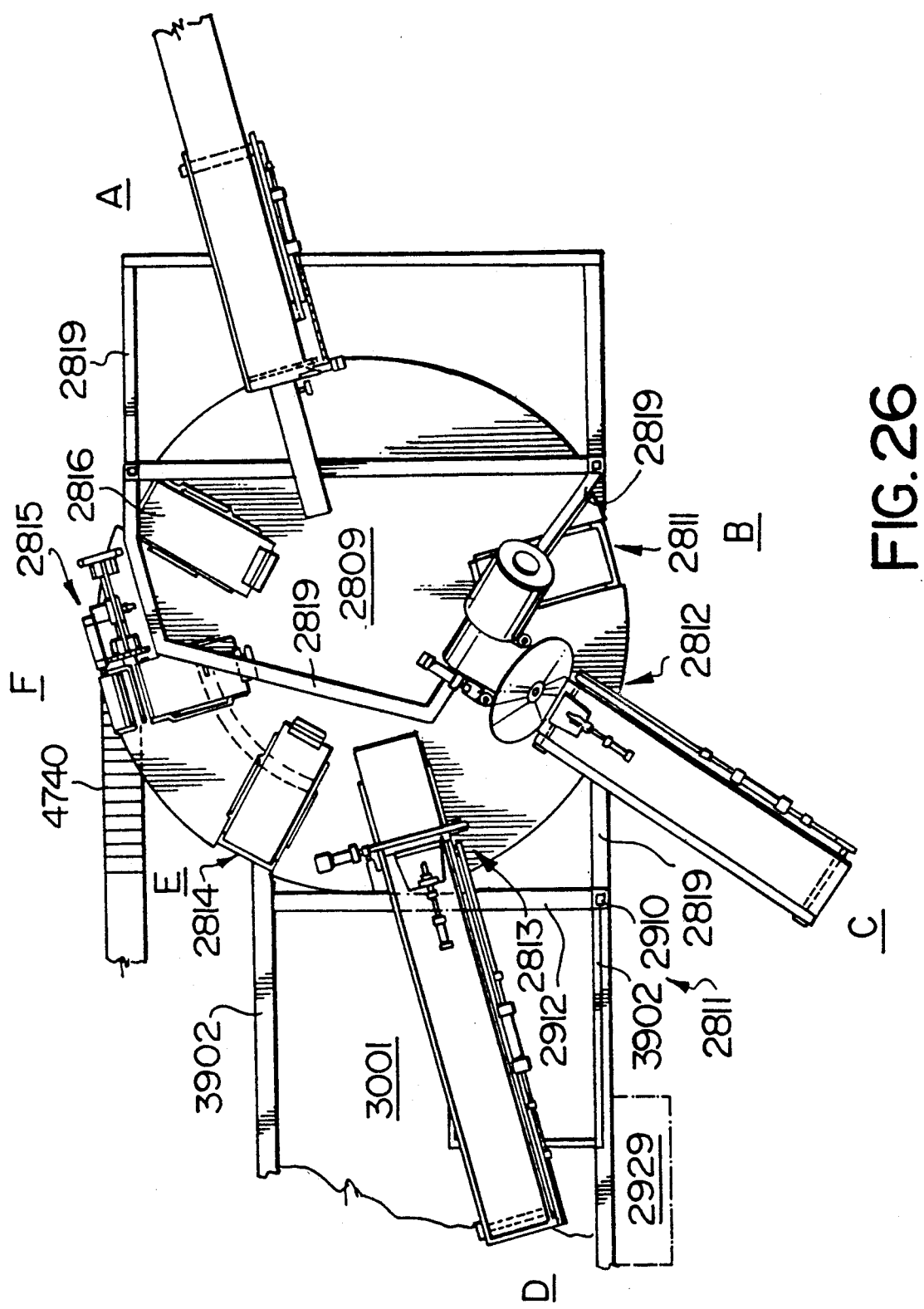
FIG. 26 is a top plan view of the food production apparatus of a second embodiment of the invention provided by the above-identified Canadian Patent No. 1,260,318 modified by including the dough sheet feeding and sheet of dough cutting and loading mechanism of one embodiment of this invention and by including indexing conveyors for the pepperoni slicer and the cheese slicer.
Figure 27:
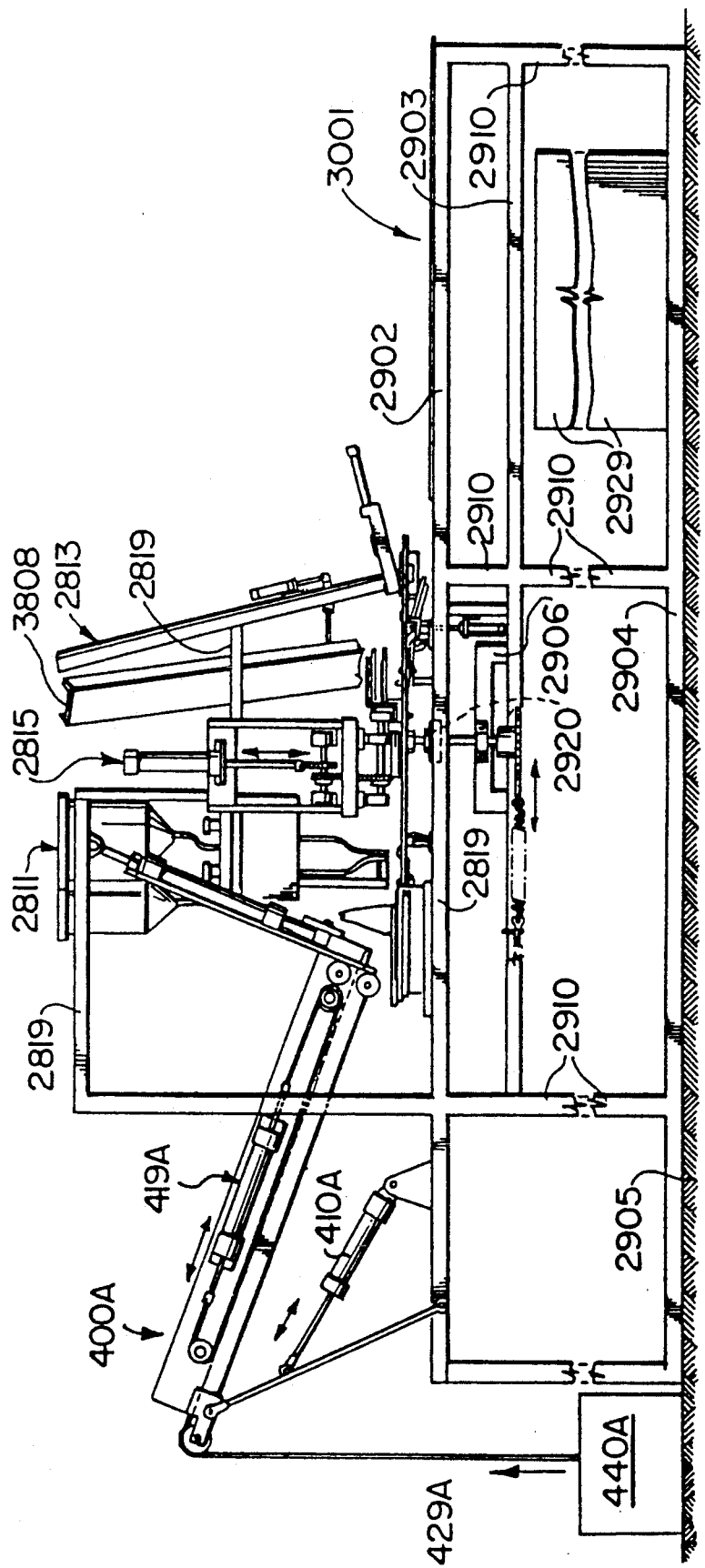
FIG. 27 is a side elevational view of the food production apparatus of this second embodiment of the invention shown in FIG. 26.

As seen more clearly in FIGS. 26 and 27, the above-described second embodiment of the invention of the above-identified Canadian Patent No. 1,260,318, is built around a main rectangular parallelepiped frame 3001. Such frame 3001 is provided by a side frame which includes an upper, longitudinal beam 2902, resting on a floor 2905, a lower longitudinal base beam 2904 and a mid-longitudinal beam 2903 which is midway between, and parallel to beam 2902 and base beam 2904. The side frames are connected together by transverse beams 2912, 2913 and leg 2910. Mounted atop main frame 3001 is an upper framework including plates, cross pieces, longitudinal pieces and bracing pieces, all numbered 2819. Mounted within a bore 2920 in a support table 2902 supported on framework 2903 of the main frame 3001 is an intermittently-rotationally-driven, rotary table 2809, driven as will be described hereinafter with reference to FIG. 30.

The main frame 3001 serves not only to support the rotary table 2809, and to provide a base to support the superposed processing stations (to be described in detail hereinafter), but also to provide a site for the operating mechanisms.

Thus, the main frame 3001 provides a site to accommodate a pair of over-ride clutch, chain-driven sprockets 2922, each driving a respective shaft 2933 for a respective dough tray 2924 to be described later. This drive shaft mechanism is supported between beams 2902 and 2903 and vertical cross piece 2925.

While not seen in FIGS. 26 and 27, the main frame 3001 provides the site for an air supply manifold for the pneumatic cylinders (to be described later) which operate the various processing stations, as well as the vacuum cylinders to supply vacuum to operate the vacuum pick-up pads (to be described later). The main frame 3001 also provides a site for a computer and valve enclosure 2929 for the microprocessor, which is the preferred mechanism to control the synchronized operation of the apparatus. For aesthetic appearance, the main frame 3001 is also enclosed by a skirt (not seen) at the two lateral sides and at the fore and aft ends.

The sheet of dough feeders at STATION A are of the same general construction as the dough sheet feeders specifically described previously with respect to FIGS. 3A and 3B. However, because the conveyor is different, the following description thereof is provided.

Figure 28A:
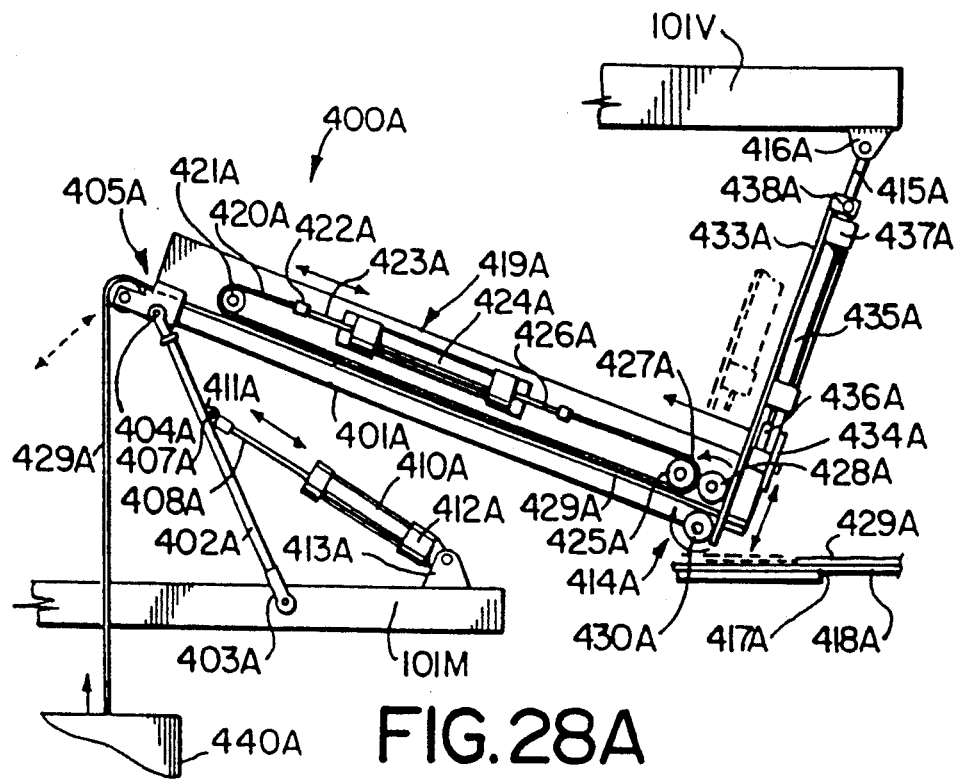
FIG. 28A shows the dough sheet feeder/cutter in its "up" or feeding orientation.
Figure 28B:
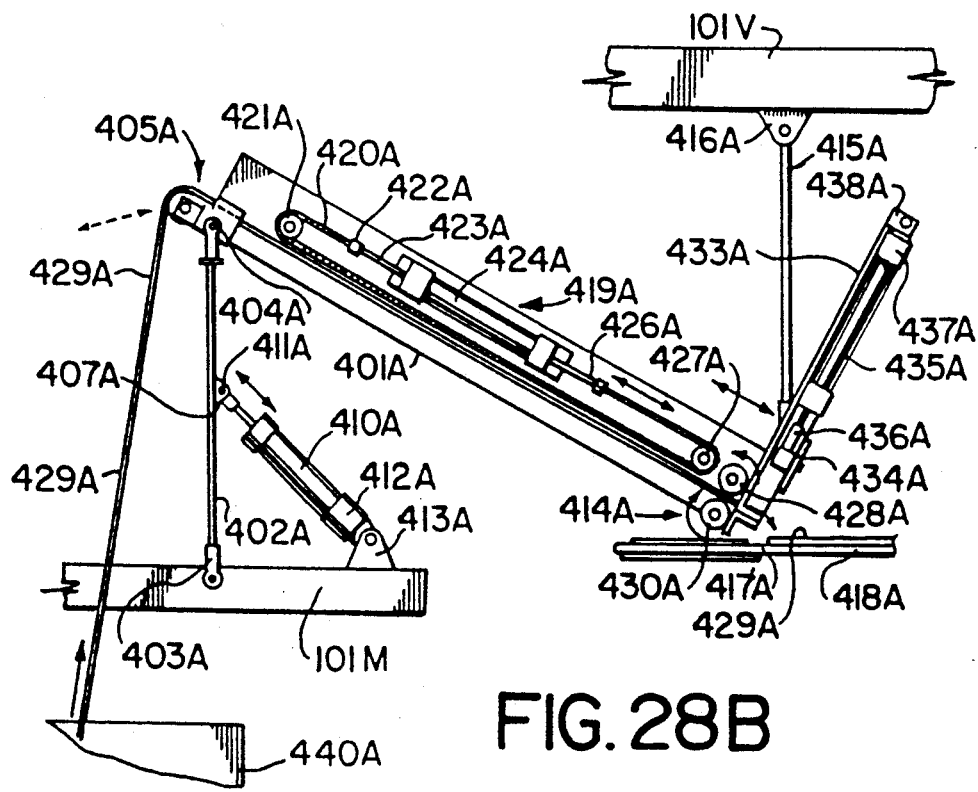
FIG. 28B shows the dough sheet feeder/cutter in its "out" or cutting orientation.

As seen in FIGS. 28A and 28B the dough sheet feeder/cutter 400A of a second embodiment of this invention includes a feed tray 401A supported above the machine framework 3001M by means of a pivotally-mounted upstanding arm 402A. The lower end 403A of the arm 402A is pivotally secured to the machine framework 3001M, while the upper end 404A of the arm 402A is pivotally secured to the upper end 405A of the feed tray framework 405A. The arm 402A is pivotally connected adjacent its mid-point 407A to the rod end 408A of a pneumatic cylinder 410A, at an ear 411A secured to the arm 402A. The cylinder end 412A of the pneumatic cylinder 410A is pivotally connected to an ear 413A secured to the machine framework 3001M.

The lower end 414A of the feed tray framework 401A is supported by a pivotally mounted depending arm 415A, pivoted to an ear 416A secured to the machine overhead frame 3001V, so that the lower end 414A of the feed tray 401A is adjacent the sheet of dough tray 417A on the rotary table 2809.

The feed tray 401A is provided with a feeding mechanism 419A including a chain drive 420A entraining an upper drive sprocket 421A, the free upper end 422A of the chain drive 420A being secured to the upper rod end 423A of a double-acting, pneumatic cylinder 424A. The chain drive 420A also entrains an indexing clutch drive 425A being secured to the lower rod end 426A of the double acting air cylinder 424A. The lower end 427A of the chain drive 420A is in driving contact with an upper dough sheet roller 428A which is adapted to be in driving contact with a continuous dough sheet 429A. A lower dough sheet roller 430A, driven in a direction opposite to the direction of the upper dough sheet roller 428A is also adapted to be in driving contact with a continuous dough sheet 429A.

The rollers 428A, 430A are each rotated by means of a single, double-acting, double-rod-end pneumatic cylinder 424A, the rod ends 426A of which being tied to opposite end of a chain 431A, so that operation of the cylinder results in rotation of the pair of sprockets 421A, one sprocket 4211A being driven in a clockwise direction, the other sprocket 4212A being driven in a counter clockwise direction, to result in corresponding rotations.

Secured to the lower end 432A of the depending arm 415A is a framework 433A supporting a guillotine knife blade 434A. The guillotine blade 434A is actuated by the power stroke of a pneumatic cylinder 435A, the rod end 436A of the cylinder 435A being secured to the guillotine blade 434A, the cylinder end 437A being secured to the upper end 438A of the framework 433A.

In operation, the continuous dough sheet is pulled up out of the handling container and is pulled along the feed tray by means of the double rollers until a predetermined extent of the continuous dough sheet extends beyond the feed tray of the rotary conveyor. At this time the sheet of dough tray of the rotary conveyor is under the overhanging dough sheet.

At this precise moment, the air cylinder is actuated to the power stroke, thereby urging the feed tray downwardly and rearwardly. Also at this precise moment, the guillotine knife operating cylinder is actuated so that the power stroke thereof severs the continuous dough sheet to provide an individual sheet of dough laid across the dough tray of the conveyor in a diamond orientation.

These two actions take place while the rotary table is stationary.

Then the rotary table is rotated again. The guillotine knife operating cylinder is actuated to its return stroke and the knife framework is urged rearwardly to its "out" position. The feed tray operating cylinder is actuated to its return stroke, to move the feed tray frame upwardly and forwardly. It is to be observed that during this stop-and-start operation of the actuating cylinders, and intermittent rotation of the rotary table, the continuous dough sheet is being continuously pulled out of the handling container.

The sequence of operations is then repeated a plurality of times, controlled by the synchronous timing mechanisms. In its operation, however, the apparatus of an embodiment of this invention deposits each individual sheet of dough in its diamond-shaped orientation on the sheet of dough tray forming part of the rotary table of the second embodiment of the invention in the above-identified Canadian Patent No. 1,260,318.

The square-shaped sheets of dough 3201 which are placed on hinged receiving and lift trays 2816 of the rotary table 2809, are so placed in a particular orientation, e.g. they look like a diamond when viewed from above.

Figure 29:
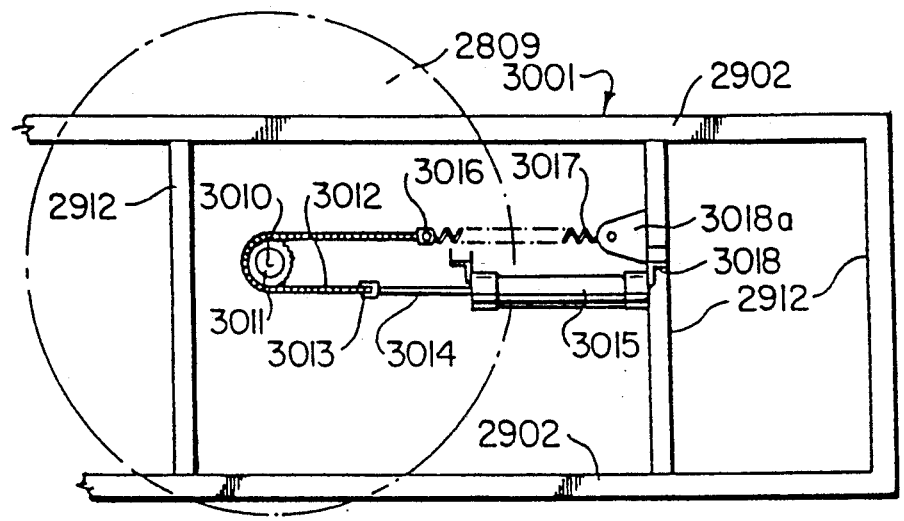
FIG. 29 is a bottom plan view (looking up) of a spring drive for the rotary table of this second embodiment of the invention of the above-identified Canadian Patent No. 1,260,318 and shown in FIGS. 26 and 27 with the rotary table shown in phantom.
Figure 30:
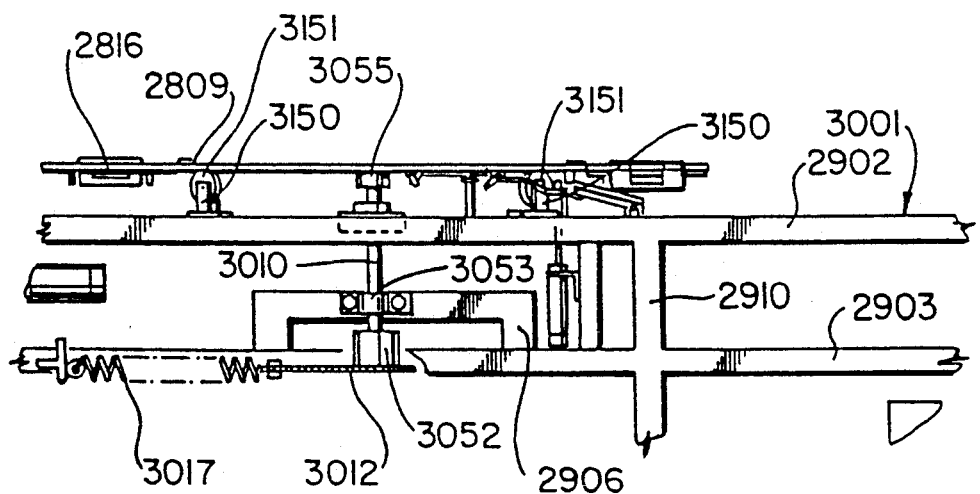
FIG. 30 is a transverse section of the spring drive for the rotary table shown in FIG. 29.

The drive mechanism for the rotary table 2809 is shown in FIGS. 29 and 30, and includes a vertically-oriented axle 3010 which is secured to the rotary table 2809 at connecting bushing 3055, and which is secured at its lower end to an override clutch 3052 and thence to a drive sprocket 3011. Axle 3010 is rotationally mounted to the frame members 2808 and 2809 by bearings 3053. Drive sprocket 3011 is partially entrained by a drive chain 3012, which is secured at one end 3013 to the rod end 3014 of a pneumatic cylinder 3015, connected by bracket 3018 to the frame member 2808, and at the other end 3016 to a coil spring 3017 which is secured to an ear 3018a attached to the main frame 3001. Thus, the power stroke of the pneumatic cylinder 3015 causes the drive sprocket 3011 to be partially rotated and the coil spring 3017 to be expanded. The return stroke of the pneumatic cylinder 3015, which completes the revolution of the drive sprocket 3011, is assisted by the contraction of the coil spring 3017.

As seen in FIG. 30, the rotary table 2902 is supported by the main frame 3001, the longitudinal beam 2902 of which is provided with a plurality (only two of which being seen) of upstanding ears 3150 within each of which is rotatably mounted a guide wheel 3151. The location of the ears 3150 and guide wheels 3151 is such that the guide wheels 3151 are inboard of the eight hinged receiving and lifting trays 2816 which, in their "at rest" position are just slightly below, but parallel to, the upper surface of the rotary table 2809. These guide wheels 3151 thus provide a suitable support for the rotary table 2809. It is seen, moreover from FIG. 30, that the support shaft 3010 of the rotary table 2809 is supported on bushing block 3052, and then passes through supporting bearings 3053 fixed within support frame 3054 secured to framework 2903 mounted on longitudinal beams 2903. The upper end of shaft 3010 is secured to the underface of the rotary table 2809 at securing bushing 3055.

The rotary table 2809 is now partially rotated to the next pre-set position and stopped there, with the sheet of dough 3201 at the egg mixture paste and tomato paste dispenser 2801 at STATION B.

The egg mixture paste and tomato paste dispenser 2801 at STATION B and shown in FIGS. 31 and 32 is the same as the similar apparatus described heretofore with respect to FIGS. 4, 5 and 6, but will now be further described.

Main frame 3001 supports a main framework 2819 which supports an upper sub-station 3401, an intermediate sub-station 3402 and a lower sub-station 3403. The upper sub-station 3401 includes a tank 3410 for tomato paste or tomato sauce, and a tank 3411 for a beaten egg mixture. Each tank leads to an associated pre-measuring unit 3412 within intermediate sub-station 3402, the pre-measuring unit 3412 including an entry chamber connected to the respective tank 3410, 3411 above by lines 3413, 3414 respectively. Each entry chamber is connected by its associated T-union to an outlet chamber connected to a dispensing plunger mechanism in a dispensing chamber which is operated by a pneumatic cylinder (all seen in FIGS. 4, 5 and 6). The power stroke of the plunger mechanism is pre-set to dispense the exact amount of the tomato paste sauce or the egg mixture, respectively, through its associated dispensing chamber. Each of the entry chambers and the outlet chambers is provided with a valve, operated in synchronism by respective valve cylinders. When the dispensing mechanism is operating to dispense tomato paste or egg mixture, respectively, through the dispensing chamber, the entry valve to the entry chamber operated by the entry cylinders is closed, while the dispensing valve from the outlet chamber operated by the dispensing cylinders is open; and vice versa.

As seen in FIGS. 31 and 32, the tomato paste premeasuring station has a feed line 3415 from its associated dispensing chamber to a tomato paste spreader 3416 which is secured to the rod end of a transversely-mounted pneumatic cylinder 3427. The power stroke of the rod end 3428 thereof transversely along a chord of the rotary table 2809 is sufficient to spread the tomato paste from near the lower corner to near the upper corner of the diamond-shaped sheet of dough 3201, i.e. across a long diagonal dimension of the sheet of dough 3201, while the rotary table 2809 is stationary.

The egg mixture paste premeasuring station has an associated feed line 3417 from its associated dispensing chamber to each of two egg mixture spreaders 3418. Each spreader 3418 is secured at the rod end 3419 of a respective one of two mutually perpendicularly-oriented pneumatic cylinders 3420. The cylinders 3420 are oriented along the two leading edges of the diamond-shaped sheet of dough 3201. The power stroke of each of the two egg mixture paste spreading cylinders 3420 is sufficient to spread the egg mixture paste across both the entire front or leading edges of the diamond-shaped sheet of dough 3201.

The diamond-shaped sheet of dough 3201 now has a rectangular area of tomato paste spread across a long diagonal dimension thereof, and also has a band of egg mixture spread along its two front or leading edges.

The rotary table 2809 is now partially rotated to the next pre-set position, and stopped there, with the sheet of dough containing the tomato paste and the egg mixture paste 3201 at the pepperoni slicing and loading apparatus 2812 at Station C. The above described viscous food product loading procedure is then repeated when the next sheet of dough 3201 on the next hinged receiving and lift tray 2816 arrives at Station B.

The pepperoni slicing and loading apparatus 2812 at STATION C and shown in FIGS. 33 and 34 will now be described in the following terms:

The pepperoni slicing and loading apparatus 2812 includes a supporting framework 2819 supporting an indexing conveyor entraining a pair of drive sprockets which are driven by a single double-rod-end pneumatic cylinder. An elongated holding tray 3609 is secured thereto, the holding tray 3609 being for the purpose of supporting a plurality, e.g. three, pepperoni sticks side by side. A power-operated brake flap 3610 is hingedly secured by transverse pivot 3611 to a mid-portion 3612 of the holding tray 3609 and is actuated to open (to allow entry of the pepperoni sticks) and to close (to allow gripping of the pepperoni sticks in an upright position) by means of a bar 3613 secured to the rod end 3614 of a pneumatically-operated cylinder 3115, which is secured to a support member 3613 mounted on the holding tray 3609. The cylinder 3615 is operated by air lines as previously described. A swingable carriage 3621 is mounted on the machine frame 3001. Such swingable carriage 3621 is secured to a pivot rod 3622, which is secured to a plate 3623 mounted on the main frame 3001. The carriage 3621 is adapted to be intermittently swivelled by means of its connection to the rod end 3625 of a pneumatic cylinder 3626.

A slicing arrangement 3630 is secured to the swingable carriage 3621, the slicing arrangement 3630 including a pneumatic motor 3631 which is operable to rotate a cutter blade 3632. The cutting blade 3632 is secured to a rotatable shaft 3634 which is mounted within spaced-apart bushings 3635 secured to the swingable carriage 3621. The cutting blade 3632 is indirectly driven by drive gear 3637 through gearing mechanism gear 3636 which is secured to motor drive shaft 3635, gear 3637 thereby rotating cutter blade shaft 3134. The thickness of the pepperoni sliced by the cutter blade 3632 is controlled by a blade depth gauge plate as previously described with reference to FIGS. 9, 10 and 11.

The rotary table 2809 is now partially rotated to its next pre-set position, and stopped there, and above-described pepperoni slicing and loading procedure is then repeated when the next sheet of dough 3201 on the next hinged receiving and lift tray 2816 arrives at Station C.

The rotary table 2809 is now stopped at the cheese slicing and loading apparatus 2813 at STATION D.

The cheese slicing and loading apparatus 2813 at STATION D and shown in FIGS. 35, 36 and 37 will now be described in the following terms:

Such cheese slicing and loading apparatus 2813 is supported on framework 2819 supporting an indexing conveyor entraining a pair of drive sprockets which are driven by a single double-rod-end pneumatic cylinder. An elongated holding tray 3808 is secured thereto, the holding tray 3808 being for the purpose of supporting a rectangular-cross section bar of cheese (not seen). A power operated brake flap 3810 is hingedly secured at transverse pivot 3211 to a mid-portion 3812 of the holding tray 3808 and is actuatable to open (to allow entry of the cheese) and to close (to allow gripping of the cheese in an upright position) by means of a bar 3812 secured to the rod end 3814 of a pneumatically-operated flap cylinder 3815 which is, in turn, secured to the holding tray 3808. Cylinder 3815 is operated by air lines in the manner previously described.

The actual cheese slicer mechanism is provided by a wire cheese cutter 3823. The wire cheese cutter 3823 is stretched across a cutter assembly 3832, the frame 3833 at its inboard end being attached to the rod end 3825 of a pneumatic cylinder 3826. The cutter assembly 3832 is longitudinally actuatable within an assembly holding frame generally indicated by reference numeral 3834 provided by fore and aft cross pieces and parallel side pieces. The thickness of sliced cheese is set by an adjustable gauge bar 3807.

The rotary table 2809 now rotates to its pre-set position where the now loaded sheets of dough 3201 are to be overlapped-folded by the folding mechanism 2815 at STATION E. The above described cheese slicing and loading procedure is then repeated when the next sheet of dough 3201 on the next hinged receiving and lift tray 2810 arrives at STATION D.

The pre-set position is assured by means of a lock and indexing device 3300. Disposed between the STATION D and STATION E, and situated beneath the rotary table 2809, is the lock and indexing device 3300 shown in FIG. 38. This device 3300 includes an indexing lug 4101 below the rotary table 2809 at each of stations A-F. Each such indexing lug 4101 depends from the bottom 4102 of the rotary table 2809. Lug 4101 is adapted to be locked at its upstream face by the upstream end of arm 4103, which is pivoted at 4101 near its downstream end at 4105 to an ear 4106 upstanding from longitudinal beam 2902 of main frame 3001. A pneumatic cylinder 4107 is vertically mounted to an upright 4108 between longitudinal beams 2902 and 2903 of main frame 3001 by means of bracket 4109. The rod end 4110 of pneumatic cylinder 4107 is connected at 4111 to a rod 4112, which is itself encircled by a coil spring 4113 and which pierces a "T"-shaped cam 4114. One end of rod 4112 is secured to cam 4114 by nut 4115. The other end 4116 of the "T"-shaped cam 4114 abuts the bottom of the upstream end of arm 4103. The upright portion 4116 of the "T"-shaped cam 4114 is adapted to lock, by abutment, the other face of the lug 4101.

The rotary table 2809 is now partially rotated to its preset position where the loaded sheet of dough 3201 is at the loaded dough sheet folding station 2815 at STATION E.

The loaded dough folding apparatus 2815 at STATION E will now be described in the following terms:

As shown in FIG. 39, the loaded sheet of dough folding apparatus 2815 in this embodiment includes a set of radially-oriented, hinged folding arms 4210, each set comprising a pair of parallel such arms 4210 secured below each radial edge 4211 of each of the eight wells 2817 in the rotary table 2809, each well supporting each a respective hinged receiving and lift tray 2816. The hinged receiving and lift tray 2816, to be further described later, is disposed below, and spaced radially from, radial edges 4211 of well 2817, to provide radial entry slots 4230, for the hinged folding arm 4210. The hinged folding arms 3610 each include an inner arm 4212 hingedly connected at its shoulder end 4213 to an ear 4214 depending from the rotary table 2809 and a folding forearm 4215, hingedly connected at its elbow end 4216 by transverse pivot 4217 to the elbow end 4218 of the inner arm 4212. The outer free ends 4218 of the pair of forearms 4215 are each interconnected by a respective cross rod 4219.

The rotary table 2809 is now partially rotated to its preset position where the loaded folded sheet of dough 3201 is to be rolled by rolling mechanism 2815 at STATION F. The above described loaded dough sheet folding operation is then repeated when the next loaded sheet of dough 3201 on the next hinged receiving and lift tray 2816 is at STATION E.

Figure 40:
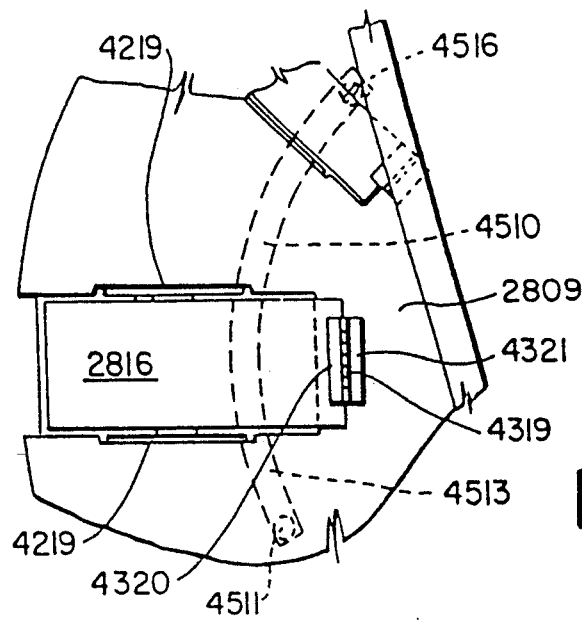
FIG. 40 is a top plan view of one hinged receiving and lift tray with a scroll plate used in its operation shown in phantom of this second embodiment of the invention of the above-identified Canadian Patent No. 1,260,318 and shown in FIGS. 26 and 27.
Figure 41:
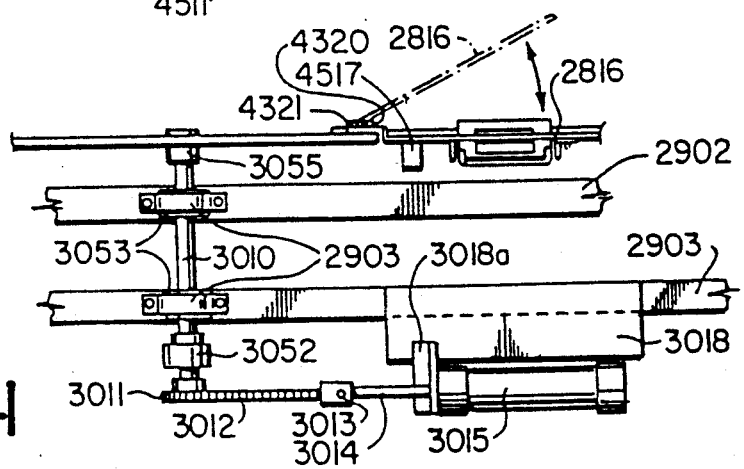
FIG. 41 is a transverse section of the operating mechanism for the drive of the rotary table of this second embodiment of the invention of the above-identified Canadian Patent No. 1,260,318 and shown in FIGS. 26 and 27.
Figure 42:
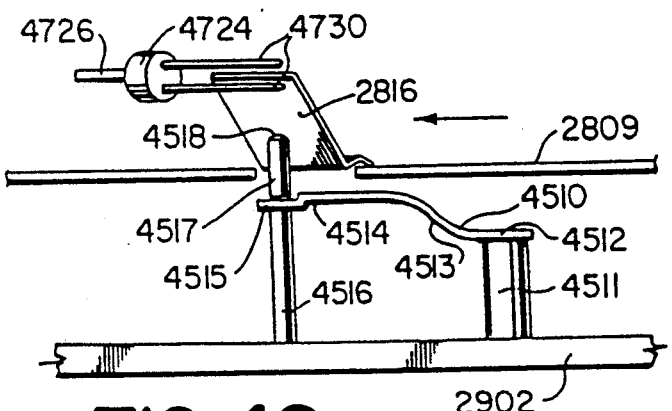
FIG. 42 is a transverse section through the rotary table showing the scroll plate mechanism for raising the hinged receiving and lift tray, and a portion of one embodiment of a rolling apparatus of this second embodiment of the invention of the above-identified Canadian Patent No. 1,260,318 and shown in FIGS. 26 and 27.
Figure 43:
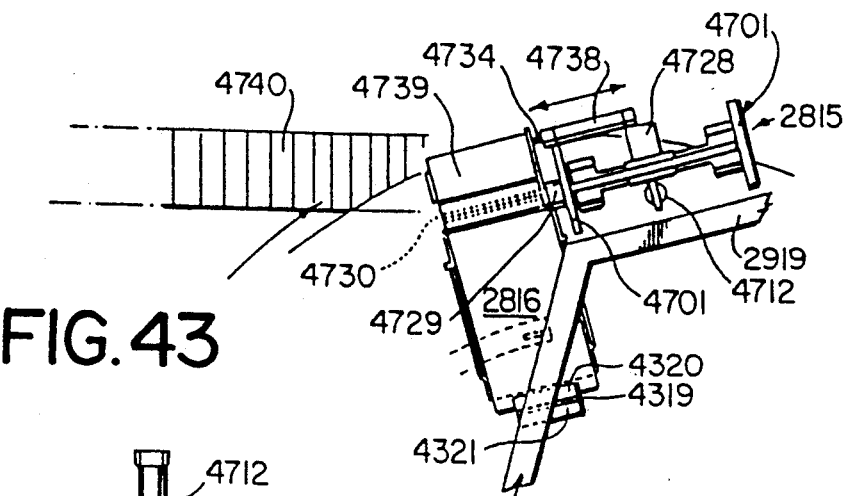
FIG. 43 is a plan view of one embodiment of the rolling apparatus of this second embodiment of the invention of the above-identified Canadian Patent No. 1,260,318 and shown in FIGS. 26 and 27.
Figure 44:
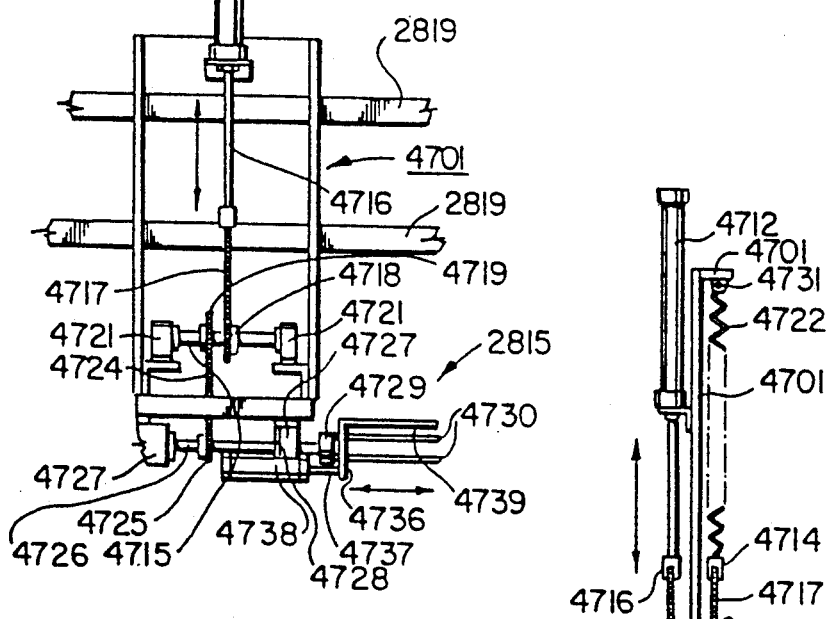
FIG. 44 is a front elevational view of the drive mechanism of one embodiment of the rolling apparatus of this second embodiment of the invention of the above-identified Canadian Patent No. 1,260,318 and shown in FIGS. 26 and 27.
Figure 45:
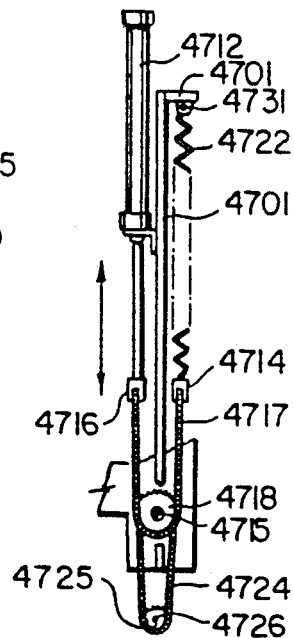
FIG. 45 is a side elevational view of the drive mechanism shown in FIG. 44.

Preparatory to the rolling operation, the hinged receiving and lift tray 2816 must be lifted, as follows: As shown in FIGS. 40 and 41, a scroll plate 4510 is disposed under STATIONS E and F to raise each hinged receiving and lift tray 2816 to a position (as shown in FIGS. 44 and 45) where the overlapped-folded dough sheet 3201 may be rolled. The scroll plate 4510 is arcuate in plan view, (See FIG. 40) and in elevation (See FIG. 42) includes an upstream post 4511 supporting the upstream end 4512, a gently-upwardly curved mid-portion 4513 and a downstream portion 4514 terminating in a flange 4515. The flange 4515 is supported by an outboard post 4516. Posts 4511 and 4516 are upstanding from longitudinal beam 2902 of main frame 3001.

The rotary table 2809 is now stopped at STATION F, so that the rolling mechanism 2815 may be operated. The loaded, folded sheet of dough rolling apparatus 2810 at STATION F is similar to the loaded folded sheet of dough rolling apparatus previously described and shown in FIGS. 16-19.

Such sheet of dough rolling apparatus 2815 includes an upwardly-standing, three-dimensional frame 4701, secured to upstanding framework 2819. Mounted within frame 4701 is a drive mechanism comprising a pair of tandemly-operated, vertically-oriented, pneumatic cylinders 4712, the rod ends 4716 of which each being tied to a chain 4717 which entrains a sprocket 4718. The other end 4714 of chain 4717 is tied to a coil spring 4722 whose other end is secured to ear 4731 mounted on frame 4701. The power stroke of cylinder 4712 causes sprocket 4718 to rotate one half turn and to extend spring 4722. The return stroke of cylinder 4712 is assisted by the return of spring 4722 and this completes the rotation of sprocket 4718. Sprocket 4718 is splined to shaft 4715 to which a speed-reduction sprocket 4719 is also splined. Shaft 4715 is freely rotatably mounted between a pair of spaced-apart bearings 4721. Sprocket 4719 is itself entrained by a second drive chain 4724 which entrains a finger-drive sprocket 4725. Finger drive sprocket 4725 is splined to a shaft 4726 which is freely rotatably mounted between a pair of spaced-apart bearings 4727. The inboard end of the shaft 4726 is provided with a mounting cylinder 4729 fitted with a pair of rolling fingers 4730. A finger unloading cylinder 4738 is mounted by its cylinder end to basket 4736, the rod end 4737 the cylinder 4738 being secured to a rolling guide plate and product discharge 4739.

The rotary table 2809 is now partially rotated to its preset position where the empty receiving and lift trays 2816 may be later moved into position to be loaded with a sheet of dough 3201. The above described loaded, folded sheet of dough lifting and rolling operations are then repeated when the next loaded, folded sheet of dough 3201 arrives at the next rolling mechanism 2815 at STATION F.

If it is desired to produce a meat-filled, rolled-up, overlapped folded-over, dough product, e.g. a taco, or an egg roll, then the processing stations for loading tomato paste, pepperoni, and cheese are replaced by an egg mixture, leading edges-coating station and by a ground product, e.g. ground or minced meat loading station (not shown here) disposed around the rotary table 2809. STATION B for applying the egg mixture to the leading edges of the diamond-shaped dough sheet is still required and operates as previously described.

The remaining stations for folding and rolling the filled product are part of the apparatus as previously described, and are operated in the same fashion as previously described.

A third embodiment of dough sheet feeder of the apparatus of the embodiment of the invention of the above-identified Canadian Patent No. 1,260,318 is shown in FIGS. 46-47. The rotary table 2809 and STATIONS B-F are the same in this third embodiment of the apparatus of the present invention as in the second embodiment of the invention of the above-identified Canadian Patent No. 1,260,318 previously described.

However, in this third embodiment, the dough sheet feeder apparatus comprises two identical apparatus of one embodiment of the present invention disposed around the rotary table and spaced 60° apart to provide twice the feeding speed and capacity. Accordingly, the following description is provided.

As seen in FIGS. 46 and 47 a pair of dough sheet feeder/cutters 400B, 400C of a third embodiment of this invention each includes a feed tray 401B, 401C supported above the machine framework 3001M by means of a pivotally-mounted upstanding arm 402B, 402C. The lower end 403B, 403C, respectively, of the arm 402B, 402C, respectively, is pivotally secured to the machine framework 3001M, while the upper end 404B, 404C, respectively, of the arm 402B, 402C, respectively, is pivotally secured to the upper end 405B, 405C, respectively, of the feed tray framework 406B, 406C, respectively. The arm 402B, 402C is pivotally connected adjacent its mid-point 407B, 407C, respectively, to the rod end 408B, 408C, respectively, of a pneumatic cylinder 410B, 410C, respectively, at an ear 411B, 411C, respectively, secured to the arm 402B, 402C, respectively. The cylinder end 412B, 412C, respectively, of the pneumatic cylinder 410B, 410C, respectively, is pivotally connected to an ear 413B, 413C, respectively, secured to the machine framework 3001M.

The lower end 414B, 414C of the feed tray framework 401B, 401C, respectively, is supported by a pivotally mounted depending arm 415B, 415C, respectively, pivoted to an ear 416B, 416C, respectively, secured to the machine overhead frame 3001V, so that the lower end 414B, 414C, respectively, of the feed tray 401B, 401C, respectively, is adjacent the sheet of dough tray 417B, 417C, respectively, on the rotary table 2809.

The feed tray 401B, 401C, respectively, is provided with a feeding mechanism 419B, 419C including a chain drive 420B, 420C entraining an upper drive sprocket 421B, 421C, respectively, the free upper end 422B, 422C, respectively, of the chain drive 420B, 420C, respectively, being secured to the upper rod end 423B, 423C, respectively, of a double acting air cylinder 424B, 424C, respectively. The chain drive 420B, 420C, respectively, also entrains an indexing clutch drive 425B, 425C, respectively, being secured to the lower rod end 426B, 426C, respectively, of the double acting air cylinder 424B, 424C, respectively. The lower end 427B, 427C, respectively, of the chain drive 420B, 420C, respectively, is in driving contact with an upper dough sheet roller 428B, 428C, respectively, which is adapted to be in driving contact with a continuous dough sheet 429B, 429C, respectively. A lower dough sheet roller 430B, 430C, respectively, driven in a direction opposite to the direction of the upper dough sheet roller 428B, 428C, respectively, is also adapted to be in driving contact with a continuous dough sheet 429B, 429C, respectively.

The rollers 428B, 428C and 430B, 430C, respectively, are each rotated by means of double acting, double-rod-end, pneumatic cylinders 424B, 424C, respectively, the rod ends 426B, 426C, respectively, of which being tied to opposite ends of a chain 431B, 431C, respectively, so that operation of the cylinder results in rotation of the pair of sprockets 421B, 421C, respectively, one sprocket 4211B, 4211C, respectively, being driven in a clockwise direction, the other sprocket 42112B, 4212C, respectively, being driven in a counter clockwise direction, to result in corresponding rotations.

Secured to the lower end 432B, 432C, respectively, of the depending arm 415B, 421C, respectively, is a framework 433B, 433C, respectively, supporting a guillotine knife blade 434B, 434C, respectively. The guillotine blade 434B, 434C, respectively, is actuated by the power stroke of a pneumatic cylinder 435B, 435C, respectively, the rod end 436B, 436C, respectively, of the cylinder 435B, 435C, respectively, being secured to the guillotine blade 434B, 434C, respectively, the cylinder end 437B, 437C, respectively, being secured to the upper end 438B, 438C, respectively, of the framework 433B, 433C, respectively.

In operation, a pair of continuous dough sheets is pulled up out of a respective handling container and is pulled along the respective feed tray by means of the respective double rollers until a predetermined extent of each continuous dough sheet extends beyond the respective feed tray. At this time a respective sheet of dough tray of the rotary table is under a respective overhanging dough sheet.

At this precise moment, the respective air cylinder is actuated to the power stroke, thereby urging the respective feed tray downwardly and rearwardly. Also at this precise moment, the respective guillotine knife operating cylinder is actuated so that the power stroke thereof severs a respective continuous dough sheet to provide a respective individual sheet of dough laid across a respective sheet of dough tray of the rotary table in a diamond orientation.

These two actions take place while the rotary table is stationary.

Then the rotary table is rotated two stages of a partial rotation. The respective guillotine knife operating cylinder is actuated to its return stroke and the respective knife framework is urged rearwardly to its "out" position. The respective feed tray operating cylinder is actuated to its return stroke, to move the respective feed tray frame upwardly and forwardly. It is to be observed that during this stop-and-start operation of the actuating cylinders, and the intermittent rotation of the rotary table, the continuous dough sheets are being continuously pulled out of the respective handling container.

The sequence of operations is then repeated a plurality of times, controlled by the synchronous timing mechanisms so that two sheets of dough are loaded at one time.

The operation of the tomato paste dispenser, the egg mixture paste dispenser, the pepperoni slicers, the cheese slicers, the sheet of dough folders, the sheet of dough rollers, the meat filler, the indexing device and the scroll plate are each the same as previously described with reference to FIGS. 26–45 and so will not be described further.

Thus the present invention in its various embodiments provides a dough sheet feeder, cutter and dispenser for use in a food processing machine which feeds a finger roll product to loading trays and then to another processing station, e.g., a deep fryer for the production of the final cooked food product.

We claim:

1. Apparatus for feeding, cutting and depositing dough on a dough tray station, comprising:

a pivotally-mounted feed tray;

means on said feed tray for gripping a continuous dough sheet and for advancing it forwardly along said feed tray to a downstream end of said feed tray;

means for cutting a discrete sheet of dough from a portion of said continuous dough sheet overlapping said feed tray whereupon said gripping means deposits said discrete sheet of dough on said dough tray station;

means for moving an upstream end of said feed tray upwardly to a first position, maintaining said upstream end at said first position for a first predetermined period of time during which said continuous sheet of dough is being advanced forwardly along said tray, moving the upstream end of said feed tray downwardly to a second position, and maintaining said upstream end at said second position for a second predetermined period of time during which said discrete sheet of dough is being cut.

2. The apparatus of claim 1, wherein said means for gripping said continuous dough sheet comprises a pair of counter-rotatably driven rollers at the downstream end of said feed tray.

3. The apparatus of claim 1, wherein said means for gripping said continuous dough sheet comprises a pair of counter rotatably driven rollers at the downstream end of said feed tray; a drive for said counter-rotatably driven rollers comprising a chain drive operated by a single double-acting, double-rod-end, pneumatic cylinder.

4. The apparatus of claim 1, wherein said means for gripping said continuous dough sheet comprises a pair of counter-rotatably driven rollers at the downstream end of said feed tray; and a drive for said counter-rotatably driven rollers comprising a chain drive operated by a single double-acting, double-rod-end, pneumatic cylinder, said chain drive including an upstream driven sprocket and a downstream indexing clutch drive.

5. The apparatus of claim 4, wherein said counter-rotatably driven rollers pull up a continuous dough sheet from a handling container.

6. The apparatus of claim 1, wherein the means for cutting comprises a guillotine knife blade.

7. The apparatus of claim 1, wherein the means for cutting comprises a guillotine knife blade, said knife blade being operated by the power stroke of a pneumatic cylinder.

8. The apparatus of claim 1, wherein the means for moving the upstream end of said feed tray upwardly and downwardly includes a pneumatic cylinder having a rod end which is secured to a link arm.

9. The apparatus of claim 1, wherein said means for moving includes a link-arm pivotally connected at an end thereof to said upstream end of said feed tray, and a pneumatic cylinder having a rod end which is pivotally secured to a mid-point of said link arm so as to form a cantilever such that upward and downward movement of said upstream end of said feed tray is also accompanied by forward and rearward movement, respectively, of said upstream end of said feed tray.

10. The apparatus of claim 1, wherein the downstream end of said feed tray is adjacent to a feed tray of a conveyor element of a food production apparatus.

11. The apparatus of claim 1, wherein the downstream end of said feed tray is adjacent to a feed tray of a conveyor element of a food production apparatus, said conveyor element comprising an intermittently driven longitudinally-extending, continuous conveyor provided with a plurality of spaced-apart dough trays thereon.

12. The apparatus of claim 1, wherein the downstream end of said feed tray is adjacent to a feed tray of a conveyor element of a food production apparatus, said conveyor element comprising an intermittently-rotated, rotary table provided with a plurality of circumferentially-spaced-apart dough trays thereon.

* * * * *